US011762884B2

(12) United States Patent
Walters et al.

(10) Patent No.: US 11,762,884 B2
(45) Date of Patent: Sep. 19, 2023

(54) SHARED KEY PREFIX VALUES ACROSS OBJECTS

(71) Applicant: Salesforce, Inc., San Francisco, CA (US)

(72) Inventors: Jeanine Sirah Walters, San Francisco, CA (US); Naveen Singh Jaunk, Lafayette, CA (US); Sahil Bhutani, Alameda, CA (US); Chandrakant Yemparala, Austin, TX (US); Raveendrnathan Loganathan, Sammamish, WA (US)

(73) Assignee: Salesforce, Inc., San Francisco, CA (US)

( * ) Notice: Subject to any disclaimer, the term of this patent is extended or adjusted under 35 U.S.C. 154(b) by 60 days.

(21) Appl. No.: 17/163,000

(22) Filed: Jan. 29, 2021

(65) Prior Publication Data

US 2022/0129487 A1 Apr. 28, 2022

(30) Foreign Application Priority Data

Oct. 26, 2020 (IN) .............................. 202041046518

(51) Int. Cl.
*G06F 16/28* (2019.01)
*G06F 16/248* (2019.01)
*G06F 16/2455* (2019.01)
*G06F 16/22* (2019.01)
*G06F 16/2453* (2019.01)
*G06F 16/242* (2019.01)
*G06F 16/25* (2019.01)

(52) U.S. Cl.
CPC ........ *G06F 16/288* (2019.01); *G06F 16/2282* (2019.01); *G06F 16/248* (2019.01); *G06F 16/2423* (2019.01); *G06F 16/24549* (2019.01); *G06F 16/24553* (2019.01); *G06F 16/254* (2019.01)

(58) Field of Classification Search
CPC .............. G06F 16/288; G06F 16/2282; G06F 16/24553; G06F 16/248
See application file for complete search history.

(56) References Cited

U.S. PATENT DOCUMENTS

| 6,898,590 | B1 * | 5/2005 | Streifer | ................. | G06F 16/284 |
| 7,496,556 | B2 * | 2/2009 | Huttel | ................. | G06F 16/2448 |
| 7,539,973 | B2 * | 5/2009 | Hodge | ................... | G06F 8/315 |
| | | | | | 717/115 |

(Continued)

*Primary Examiner* — Miranda Le
(74) *Attorney, Agent, or Firm* — Holland & Hart LLP

(57) ABSTRACT

A relational database system may receive, from a client, a query for a data object of a first type. The system may be configured to store a plurality of data objects of a second type such that each data object of the second type is associated with a respective data table and a respective value of a key prefix of an object identifier field. The key prefix may result in an upper limit of data objects supportable by the system. The system may determine that the query is indicative of the data object of the first type of a plurality of data objects of the first type that share a key prefix value such that the upper limit is exceeded. The system may identify a result based on determining that the query indicates data object of the first type and return a query response that indicates the result.

11 Claims, 13 Drawing Sheets

(56) References Cited

U.S. PATENT DOCUMENTS

| | | | | |
|---|---|---|---|---|
| 8,028,907 | B2* | 10/2011 | Silverbrook | G06Q 10/10 |
| | | | | 235/383 |
| 8,280,932 | B2* | 10/2012 | Horn | G06F 16/951 |
| | | | | 707/829 |
| 8,370,272 | B2* | 2/2013 | Wickel | G06Q 10/0875 |
| | | | | 705/342 |
| 8,898,194 | B2* | 11/2014 | Gorelik | G06F 16/248 |
| | | | | 707/791 |
| 9,749,457 | B2* | 8/2017 | Vendrow | H04M 3/54 |
| 10,659,523 | B1* | 5/2020 | Joseph | H04L 63/0209 |
| 10,664,375 | B2* | 5/2020 | Ransil | G06F 16/24557 |
| 2002/0184222 | A1* | 12/2002 | Kohut | G06Q 30/02 |
| 2010/0299327 | A1* | 11/2010 | Kiefer | G06F 16/8358 |
| | | | | 707/736 |
| 2020/0142901 | A1* | 5/2020 | Carpenter | G06F 16/248 |

* cited by examiner

2

SHARED KEY PREFIX VALUES ACROSS OBJECTS

CROSS-REFERENCE

The present Application for Patent claims priority to Indian Provisional Patent Application No. 202041046518 by Jaunk et al., entitled "CUSTOM OBJECT CONFIGURATION," filed Oct. 26, 2020, which is assigned to the assignee hereof and is expressly incorporated by reference in its entirety. The present application is related to copending U.S. application Ser. No. 17/163,032 by Jaunk et al., entitled "QUERYING FOR CUSTOM DATA OBJECTS" filed on Jan. 29, 2021, as the present application, and which is also expressly incorporated by reference in its entirety.

FIELD OF TECHNOLOGY

The present disclosure relates generally to database systems and data processing, and more specifically to shared key prefix values across objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may run on a relational database, and data within the relational database may be configured in tables with schemas or metadata structures (e.g., referred to as objects). Objects may be referenced with an identifier. However, there may be limits on the number of objects that can be stored within a relational database due to limits on the size of the identifier. Further, the relational database may have limits on the number of records that it can store or the number of records that each object can store. For example, if an object or the relational database exceeds a threshold number of records, the relational database may experience latency or other computational problems.

DETAILED DESCRIPTION

Figure 1:
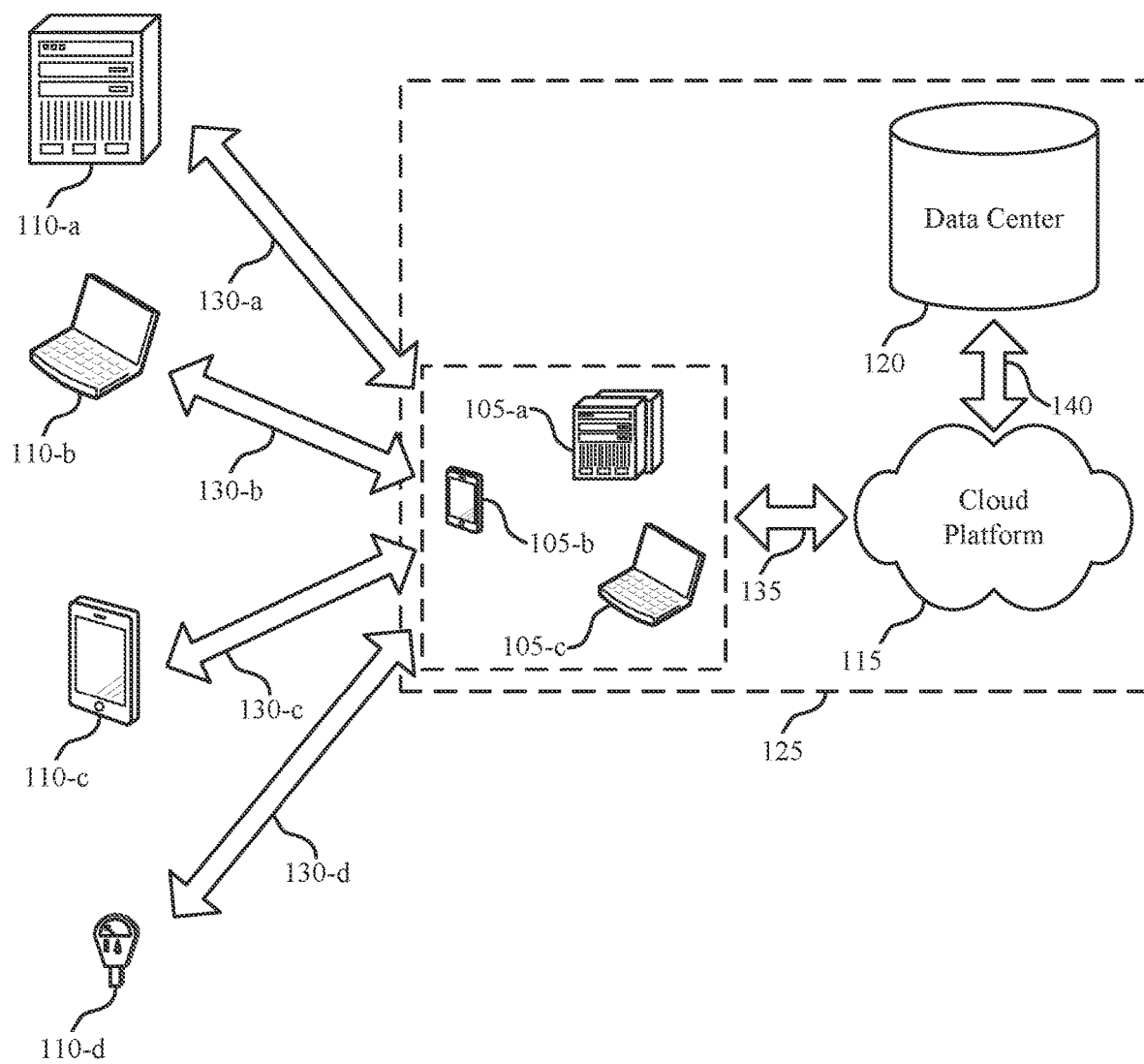
FIG. 1 illustrates an example of a data processing system that supports shared key prefix values across objects in accordance with aspects of the present disclosure.

A cloud platform (e.g., a multi-tenant cloud platform) may provide data processing and analytics solutions within a relational database. In the cloud platform, data may be stored or structured as an object (e.g., a data table schema or metadata structure). Objects may be queried by various services and clients supported by the cloud platform. An object within the relational database may be associated with a three character key prefix of an object identifier field. The number of characters for the key prefix may be preset, configured, or static such that it is limited for the relational database. Functions within the cloud platform may be driven via the key prefix. For example, the data tables within the relational database may be referenced or queryable by the key prefix, or other relationships or operations within the relational database and any platforms or applications running on or supported by the relational database may be based on the key prefix. Each key prefix may be mapped to a unique data table corresponding to an object. The limitation of the three character key prefix may result in an upper limit of objects or data tables that may be supported by the relational database system. In one example, the number of objects that can be created with a three character key prefix is approximately 238,000. However, in some cases (e.g., some applications such as a customer data platform (CDP)), a service or combination of services may require 100,000s of the tables to provide certain functionality (e.g., B2C scale) that may not be accomplished using preconfigured limitations of a relational database system.

Another limitation with respect to relational databases is related to the number of records that each data object or data table can store or the number of records that the relational database itself can store. For example, as discussed above, in a cloud platform data may be presented or configured as an object, and it may come from or be stored in a first party data center (e.g., a relational database). In some configurations, all the data associated with the objects may be stored in one single database (e.g., a relational database). The data may be exposed via simple object access protocol (SOAP) API endpoints. When the data grows overtime, the clients querying or analyzing the data and the APIs may experience increased latency because of the data scale limitations on such relational databases. For example, a relational database may be limited when the data grows more than one billion rows. This limitation makes a cloud platform unsuitable for some applications (e.g., B2C scale) where data can include trillions of rows and petabytes of data. Additionally, the compute on the monolith (e.g., core platform) is limited, and it may perform heavy data ingestion and processing in addition to serving data to client systems. Heavy compute due to ingestion and processing may result in slowed querying and impact client-side applications supported by the relational database or cloud platform. In some cases, the heavy compute and querying may result in database downtime.

In accordance with aspects of the present disclosure, to solve the limitation on the number of metadata structures or objects that can be defined for a relational database, a value of a key prefix may be associated with multiple data objects of a first type. The relational database system may also support data objects of the second type (e.g., legacy data objects) that each are associated with respective key prefix values. The relational database system may receive a query that indicates a data object of the first type and identify a result of the query based on entity information (e.g., an application programming interface (API) name or developer name) corresponding to the query. Thus, the relational database system may use the entity information to differentiate between data objects of the first type that are associated with the same key prefix value. By associating multiple data objects with the same key prefix value, the number of objects supported by the relational database system may exceed the upper limit that is configured for the relational database system. In some cases, these data objects of the first type are stored and managed by a separate data system that is accessible by the relational database system.

In accordance with aspects of the present disclosure, to solve the limitation on the number of rows or records that can be stored for each data table (or in total) within a relational database, the data may be stored in a separate data store different from the relational database, but the data tables or metadata structures (e.g., the objects) may be managed in the relational database. A data stream may be configured to support data ingestion and processing at the secondary, separate data system. As described above, different data objects of the first type may be associated with the same key prefix value. These different data objects of the first type may be stored in the separate data system. However, the queries for the data objects of the second type (stored in the relational database system) and the data objects of the first type (stored in the separate data system) may be received at and handled by the relational database system. More particularly, the queries for both types of data objects may utilize the same syntax. However, the relational database system may be configured to identify when the query is requesting an object in the separate data system and perform various operations to retrieve the data. Further, since these objects may be associated with the same key prefix value, the relational database system may be able to process and serve the data. Thus, the amount of objects and the amount of data supportable by the relational database system is increased without significant reconfiguration of the relational database system.

Aspects of the disclosure are initially described in the context of an environment supporting an on-demand database service. Aspects of the disclosure are further described with respect to systems that support a relational database system and shared key prefixes and a process flow diagram that illustrates utilization of shared key prefixes. Aspects of the disclosure are further illustrated by and described with reference to apparatus diagrams, system diagrams, and flowcharts that relate to shared key prefix values across objects.

FIG. 1 illustrates an example of a system 100 for cloud computing that supports shared key prefix values across objects in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and interne protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may use a relational database system to support various services supported by the cloud platform. For example, the relational database system may store data associated with cloud clients 105 and their customers (e.g., contacts 110). The data may include customer data, product data, purchase data, web browsing data, employee data, etc. The data may be accessible via various clients such as web browsers, web applications, websites, etc.

Some systems may implement relational database systems that may support a plurality of data objects, where each object is associated with a data table, and each row of the table corresponds to an instance of the object. In some examples, functional aspects of the relational database system may depend on a key prefix field associated with each data object. Thus, each data object of the relational database system may be associated with a different value for the key prefix field. The length (e.g., the number of characters) for this field may be determined during an initial configuration of the relational database system. Further, the length of the field may result in an upper limit in the amount of data objects supportable by the relational database system. In some examples, a three character key prefix limitation may result in an upper limit of approximately 238,000 objects. However, some applications or environments may require many more objects and tables to support some functionality. Further, after an extended period of use of the relational database system and as many objects are associated with the key prefix configuration, it may be difficult to increase the length of the key prefix value without a complete relational database reconfiguration.

Aspects of the present disclosure solve these problems by configuring the data center 120 of the cloud platform 115 to support associating multiple objects with a single key prefix value and configuring the relational database to differentiate between the multiple objects associated with the single key prefix value using additional information for the objects, such as developer name, API name, etc. Thus, when a client or service associated with a cloud client 105 queries the relational database system, the system may determine that the query is indicating one of the objects that is associated with the key prefix value that is associated with multiple objects. The relational database system may identify entity information associated with the object in order to identify the correct object and retrieve the query results. In some cases, the objects that are associated with the same key prefix value are stored in a data system that is separate from the relational database system. In such cases, the relational database system may transmit a request (e.g., an API request) to the separate data system in order to retrieve the queried data. The separate data system may be a system managed by the data center 120 or may be a third party data system, such as AMAZON® S3 bucket or similar public cloud-based storage resources. The separate data system may be an example of a relational database system or a non-relational database system. By associating multiple data objects with a same key prefix value, and using additional information to differentiate between these data objects, the upper limit associated with the key prefix length may be exceeded, thus supporting more data without a database reconfiguration.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
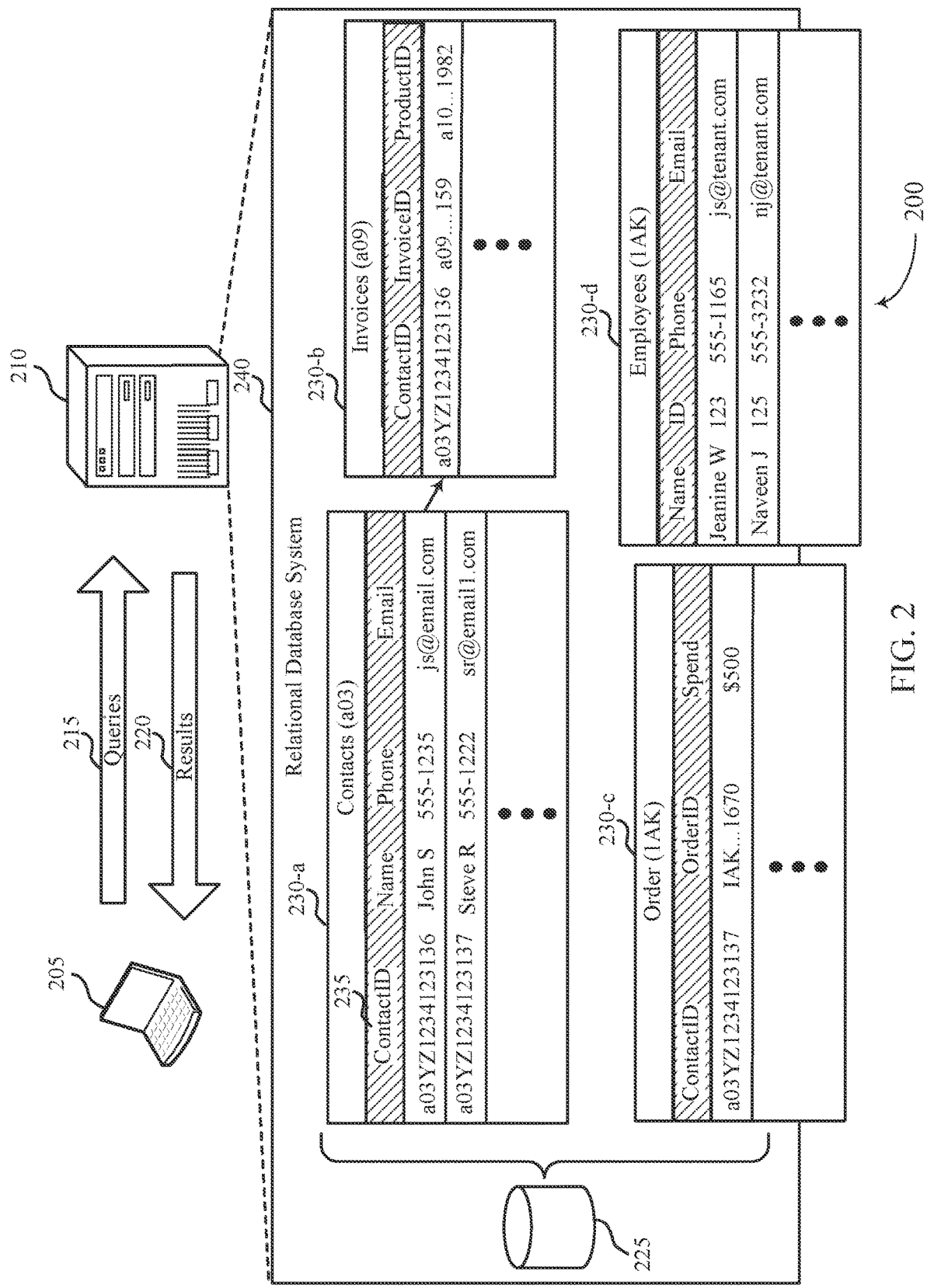
FIG. 2 illustrates an example of a system that supports shared key prefix values across objects in accordance with aspects of the present disclosure.

FIG. 2 illustrates an example of a system 200 that supports shared key prefix values across objects in accordance with aspects of the present disclosure. The system 200 includes a client 205 and a data server 210. The client 205 may represent one or more clients, services, applications, etc. that may transmit queries 215 to the data server and receive results 220 from the data server 210. For example, the client 205 may represent services, websites, applications, etc. that are supported by a cloud client 105 of FIG. 1. The client 205 may be supported or used by one or more tenants of a multi-tenant system. The client 205 may be a client that is used by employees of a tenant or by customers or contacts (e.g., contacts 110 of FIG. 1) of the tenant. The data server 210 may represent aspects of the cloud platform 115 or data center 120 of FIG. 1. The data server 210 may support various services, applications, clients (e.g., client 205) of one or more multiple tenants of a multi-tenants system.

The data server 210 may support or access a relational database system 240 for executing queries 215 and returning results 220. The relational database system 240 may include multiple data storage units 225, which may represent various types of memory and storage. The relational database system 240 includes a plurality of data tables 230. Each data table 230 may represent a data object. For example, data table 230-*a* represents a contact object and each row of the data table 230-*a* includes data that corresponds to an instance of the contact object. The objects and data tables 230 of the relational database system 240 may be related based on the utilization of identifiers or relational operators. The objects and tables may be related in the relational database system 240 using various relationship types, such as one-to-may, one-to-one, many-to-one, etc. Each instance of an object may be referenced using an object identifier field, which may be included as a column in each data table 230. For example, data table 230-*a* includes object identifier field 235 (e.g., ContactID). Other data tables 230 may include the object identifier field. For example, table 230-*b* includes in InvoiceID field, the table 230-*c* includes an OrderID field, and the table 230-*d* may include an EmployeeID field. Each table 230 may be related based the reference to the identifiers for objects of other data tables 230. The object identifier field may be used by the relational database system 240 to support various functionality, such as data processing, querying, etc.

The object identifier field (that may be applicable to each object supported by the relational database system 240) may be configured during initial setup of the relational database system 240 such that various characters in the object identifier field may represent different aspects for the data and/or the relational database configuration. Further, during initial setup, the user may select a field size for the object identifier field. An initial set of characters of the object identifier field, referred to the key prefix herein, may represent an object. As such, each instance of the object may have the same key prefix value. For example, the contacts object is associated with the key prefix value of "a03." Thus, each instance of the contact object may include an object identifier field 235 that includes the "a03" key prefix value. The other portions of the object identifier field may represent other aspects of the relational database system 240, such as the respective database where the object is stored and a row of the respective data table 230 or a tenant of a multi-tenant system. For example, the contact object associated with contact "John S" has a value for the object identifier field 235 of "a03YZ1234123136," where the "a03" value may represent that the object is a contact object, the "YZ" value may represent a database in which the object is stored, and the "1234123136" value may represent the row of the data table 230-a where the object is located. It should be understood that other configurations for the object identifier field are contemplated within the scope of the present disclosure.

Each object may have a respective key prefix value. As illustrated, the contact object has the key prefix "a03," while the invoice object has the key prefix "a09." In some cases, standardized objects for the relational database system 240 may be used by one or tenants in a multi-tenant system. In other cases, there may be customized objects, and these custom objects may each have respective key prefix values. For these custom objects, there may be a coupling between the key prefix value and the tenant. The following is an example list of key prefix values and standardized objects:
001: Account
002: Contact
003: User The following is an example list of key prefix values and custom objects:
01N: Custom Object 1
01M: Custom Object 2
01O: Custom Object 3

The limit on the number of characters or length of the key prefix of the object identifier field, as well as a coupling between the field and the tenants, may result in an upper limit of the number of data tables, and thus objects, that may be supported by the relational database system 240. However, since the relational database system 240 may store, manage, and access many thousands of objects, it may be difficult to arbitrarily increase the length of the key prefix and/or the object identifier field in order to increase the number of objects. Thus, in order to exceed the upper limit imposed by the key prefix field, in accordance with the techniques described herein, a same key prefix value may be associated with multiple data objects and data tables. Further, the relational database system 240 may use various techniques to differentiate between the data objects that are associated with the same key prefix value. As illustrated, the data table 230-c and the data table 230-d are associated with same key prefix value "1AK." Thus, each instance of an object in table 230-c and table 230-d may have an object identifier field that starts with "IAK." Thus, by associating multiple data objects with the same key prefix value and use the other techniques described herein, the number of data objects and data tables 230 supported by the relational database system may be increased. The data tables 230-c and 230-d may correspond to examples of custom objects that are configured by a particular tenant of a multi-tenant system.

The relational database system 240 may maintain a record of entity or object information in order to differentiate between objects. Thus, when the data server 210 receives queries 215, the data server 210 may analyze a query 215 to determine whether the query indicates a data object that is associated with a key prefix value that is associated with other data objects. In such cases, the data server 210 may reference the entity information for the queried for object in order to identify the correct data table 230 and retrieve the data for the query result 220. In some cases, the query 215 may include an object identifier value, such as a suffix of an object identifier, that indicates that the object is one of the objects that is associated with a same key prefix value.

Further, a user may use a service or client to create custom objects for the relational database system 240. In some cases, the custom object may be a new object of a pre-configured object type for the relational database system. In other cases, the custom object may be a new type of custom object. The relational database system 240 may create the new table 230 for the new object. If the object is a new type custom object, then the relational database system 240 may create a new table (with columns corresponding to the different field) with using the key prefix value that is associated with multiple different custom objects. In some cases, the user may determine to create the new type of custom object based on the data requirements of the new custom object. For example, if there is to be large quantity (e.g. millions) of instances of the object, then the new custom object may be used, since the new custom object may support data objects for large amounts of data that may be stored on a data system separate from the relational database system 240, as described herein.

Thus, to solve the limitation of the number of metadata or object schemas and to provide extensibility, a custom object framework may be expanded to reuse the key prefix instead of creating new ones for every custom object that is created. That is, more than one object (e.g., custom object) within a relational database may share the same key prefix value.

The following Table 1 is an example of a custom object framework that utilizes other information (e.g., developer name, API name, etc.) as a differentiator for different data objects, such that the number of data tables supported by a relational database may not be limited by the size of the key prefix:

TABLE 1

|  | Custom Object 1 | Custom Object 2 | Data Lake Object 1 | Data Lake Object 2 |
| --- | --- | --- | --- | --- |
| Key Prefix | a00 | a01 | IAK | IAK |
| Developer Name | Foo | Bar | Order | OrderItem |
| API Name | Foo_c | Bar_c | Order_dll | OrderItem_dll |
| Label | Foo | Bar | Order | Order Item |
| EntityInfo | cei1 | cei2 | dlo1 | dlo2 |
| Entity Common | cec1 | cec2 | dec1 | dec2 |
| Example Object ID | a00B000000BKqzJ | a01B0000001CvNv | 1AKB0000000QqcAu | 1AKB0000009xrpd |

In these examples, custom object 1 and custom object 2 may be a pre-configured type of custom object. Thus, each of these custom objects is associated with a different key prefix value. Further, the API Name, which may be used to query the objects ends in "_c," which may indicate that the these are the pre-configured types of custom objects. However, data lake objects 1 and 2, may be the new custom object types, and as such, are associated with the same key prefix value "IAK." Further, the API name ends in "dll," which may indicate that these objects are the object types that are associated with the same key prefix value. Thus, when the relational database system 240 receives a query with an object ending in "_dll" the relational database system 240 may determine that the object is the type of object that is associated with a shared key prefix value. In such cases, the relational database system may use the API name to determine which object that the query is referring to and reference the entity information to determine how to identify the data. The API name may be based on a name of the object that a developer chooses (e.g., developer name). This extended or revised configuration for a custom object may be available as first class custom object just like any other custom object within a platform. Every custom object may have its own suffix and exposed as first class API name such as Individual_dlm, SalesOrder_dlm, etc. The custom objects may be queried by a client (e.g., client 205) using SOAP APIs.

In some cases, these objects that share a key prefix value may be stored in a system separate from the relational database system 240. In the above examples, the data lake objects may be stored in a data lake separate from the relational database system 240. As such, the value of the key prefix may indicate the type of object that is stored in the separate data system (e.g., data lake object). Thus, in the case of multiple separate data systems, the key prefix values may differentiate between the different separate systems, but the value may correspond to multiple data objects within the respective systems. The relational database system 240 may determine, using the API name and the associated entity information, how to retrieve the data stored in the separate system, and transmit an API request for the data in the separate system.

Before introduction of the shared key prefix value, the relational database system 240 maintained a tight coupling between a key prefix value and entity information corresponding to the object associated with the key prefix value. More particularly, each object was associated with a respective key prefix value and respective entity information. The introduction of the shared key prefix value breaks that tight coupling such that multiple entities or objects may be associated with a shared key prefix value, but each entity or object sharing the value may be associated with respective entity information. As such, the relational database system 240 may maintain a record, mapping, listing, or the like of the key prefix value, entity identifier information (e.g., the API name, the developer name, or both), and the entity information in order to differentiate between the objects or entities sharing the key prefix value.

Figure 3:
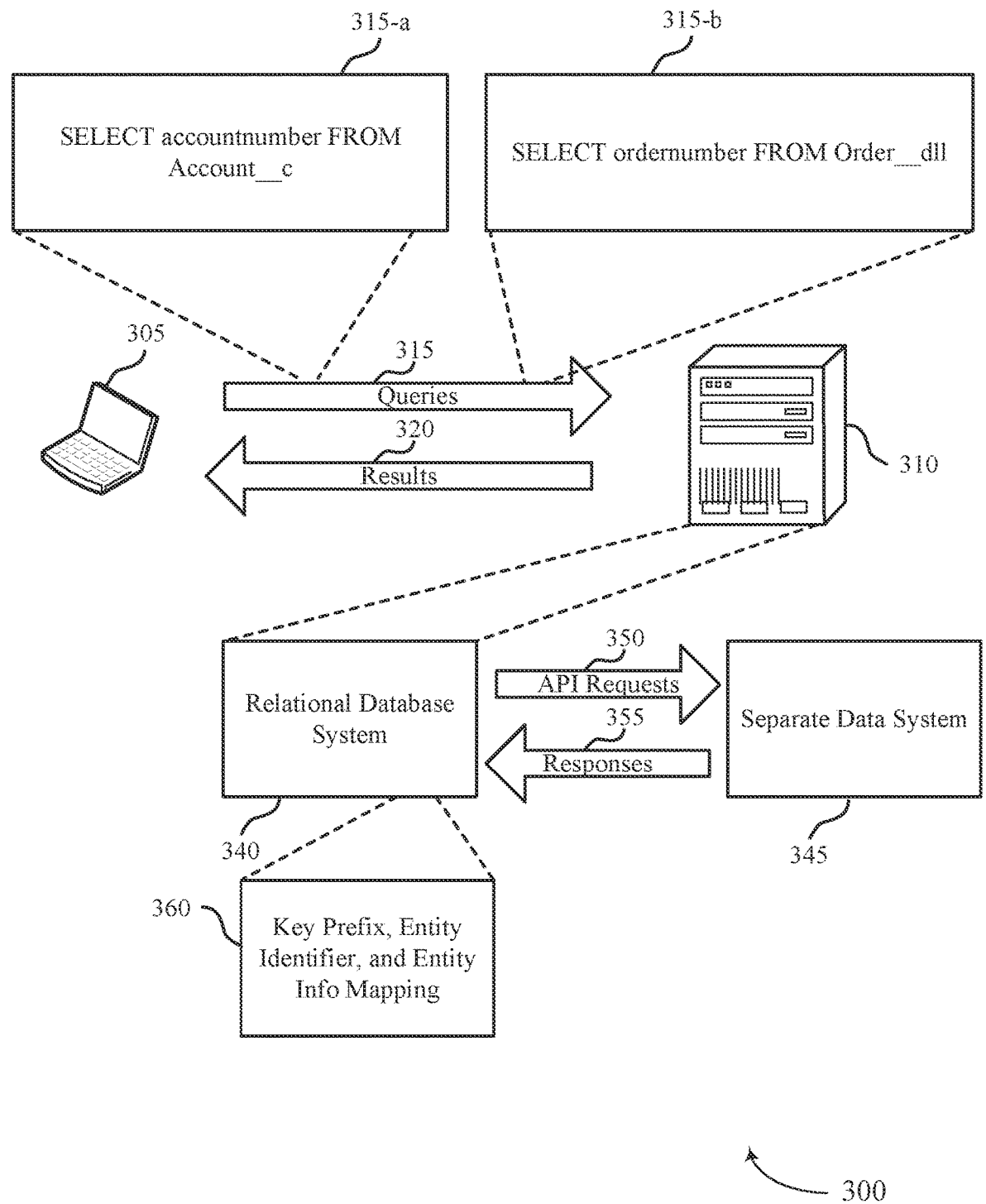
FIG. 3 illustrates an example of a system that supports shared key prefix values across objects in accordance with aspects of the present disclosure.

FIG. 3 illustrates an example of a system 300 that supports shared key prefix values across objects in accordance with aspects of the present disclosure. The system 300 includes a client 305 and a data server 310, which may be examples of the client 205 and the data server 210 of FIG. 2. The client 305 may transmit various queries 315 to the data server 310, and the data server 310 may return results 320 corresponding to the queries 315. The data server 310 may support a relational database system 340 (e.g., a core or monolith system), which may be an example of the relational database system 240 of FIG. 2. As described herein, the relational database system 340 may include multiple data tables, each corresponding to a different data object. The data objects may be referenced by an object identifier field with a key prefix. Within the relational database system 340, each data object may be associated with a separate key prefix value for data processing and retrieval. As described herein, custom objects may be configured such that multiple different objects may be associated with the same key prefix values. In some examples, these different objects that share the same key prefix value may be stored in a separate data system 345, which may be an example of a data lake or another type of data system that is capable of supporting large amounts of data, such as to increase the amount of data that may be accessed by core services or client 305.

In some examples, creating a custom object creates a table (e.g., a data table schema or metadata structure) in the off-core data lake (e.g., the separate data system 345), and metadata corresponding to the custom object in the relational database system 340. The data may be exposed via NoSQL or SOAP APIs or any similar query language or APIs. From the perspective of the client 305, the queries 315 for objects within the relational database system 340 may have the same syntax as the queries for the objects in the separate data system 345. In order to differentiate between the data objects of the separate data system 345, the relational database system 340 may maintain metadata or a data schema for the objects of the separate data system 345. As such, the relational database system 340 may receive the queries 315, determine that the queried for objects are objects that share the same key prefix value, and use the metadata to configure an API request 350 in order to retrieve the correct data of the separate data system 345 in API response 355.

In query 315-a, the query is request data corresponding to a standard custom object (e.g., an account object corresponding to a particular tenant of a multi-tenant system), which includes the "_c" suffix. The relational database system 340 may determine that the requested data corresponds to an object stored in the relational database system 340 based on the "_c" suffix, and returns the query results 320 including the requested data from the relational database system 340. In some cases, objects that are standard across each tenant do not include a suffix, and are identified based on the objects not including a suffix. In the case of query 315-b, the relational database system 340 may determine that the requested data corresponds to an object from the separate data system 345 based on the "_dll" suffix. As such, the relational database system 340 may transmit an API request 350 to the separate data system 345. The API request 350 may be generated based on the API name (e.g., Order_dll) included in the query. Thus, upon identifying the suffix that indicates that the data corresponds to one of the custom objects, the relational database system 340 may identify entity information that is stored in the relational database system based on the API name (e.g., Order) included in the query 315-b to generate the API request 350. The entity information may include information about the shared key prefix and information about how the data is stored in the separate data system 345 such that the data may be retrieved from the separate data system 345 using the API request 350. The query 315-a and 315-b use the same syntax, even though the data is in different locations. Thus, the techniques described herein support leveraging an additional database without having to reconfigure clients (e.g., client 305) for interacting with the separate data system 345.

Further, the use of the shared key prefix for these objects supports the relational database system 340 in identifying the objects in the separate data system 345.

Further, the use of the shared key prefix as well as breaking the tight coupling between entity information and the key prefixes support creating a large number of additional data objects that may be queried at the relational database system 340. As described herein, before introduction of the shared key prefix value, each data object was associated with a respective key prefix value and respective entity information. The introduction of the shared key prefix value breaks the tight coupling such that multiple entities or objects may be associated with a shared key prefix value, but each entity or object sharing the value may be associated with respective entity information. As such, the relational database system 340 may maintain a mapping 360 of the key prefix value, entity identifier information (e.g., the API name, the developer name, or both), and the entity information in order to differentiate between the objects or entities sharing the key prefix value. This mapping 360 may be referenced upon identification that the query 315 specifies an object that is the new custom object type (e.g., an object stored in the separate data system 345) in order to generate the API request 350 to retrieve the data corresponding to the query 315. This technique may be used whether the new custom objects that share the key prefix value are stored in the relational database system 340 or the separate data system 345.

Figure 4:
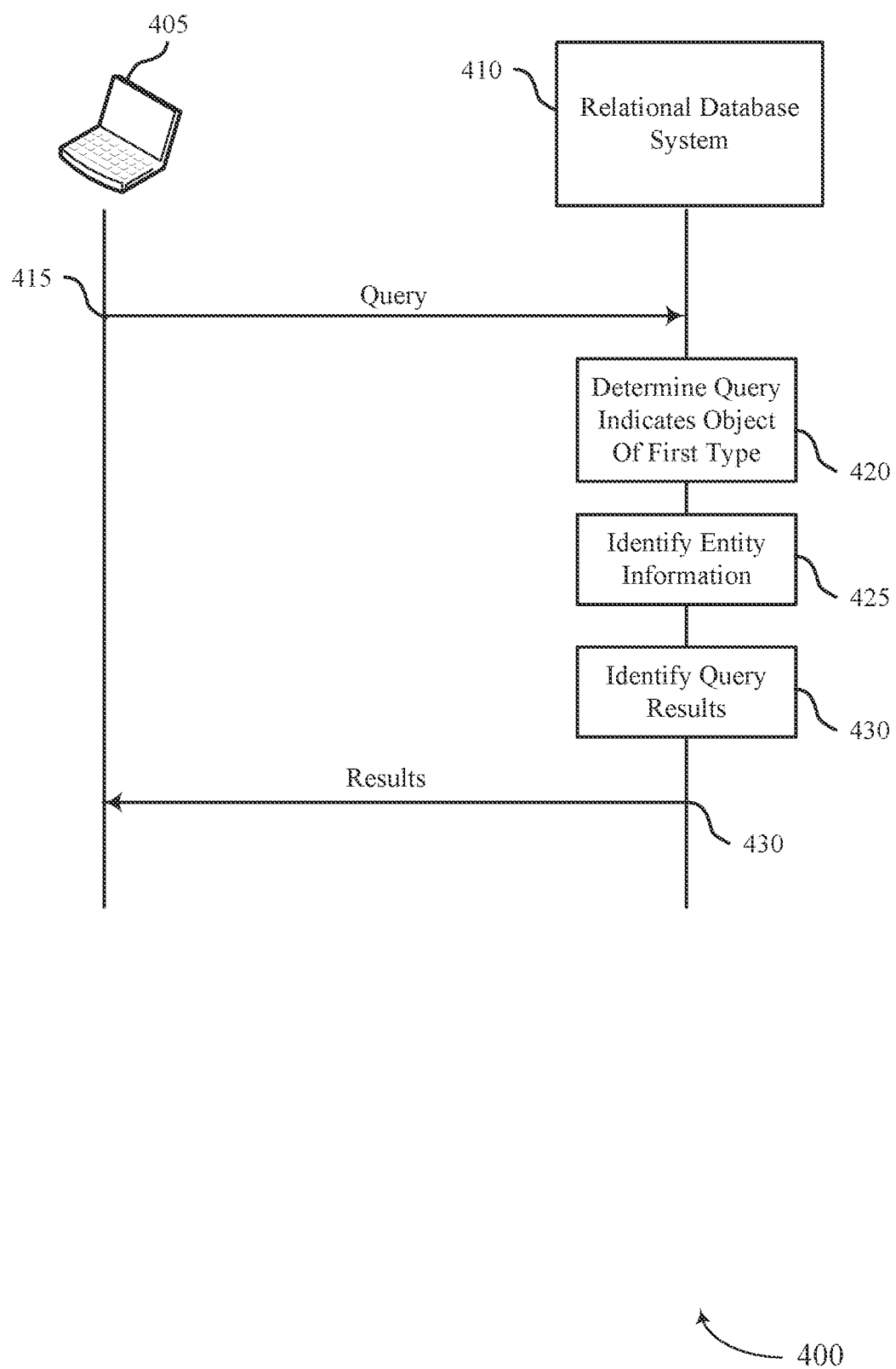
FIG. 4 illustrates an example of a process flow diagram that illustrates utilization of a shared key prefix values across objects in accordance with aspects of the present disclosure.

FIG. 4 illustrates an example of a process flow diagram 400 that illustrates utilization of a shared key prefix values across objects in accordance with aspects of the present disclosure. The system process flow diagram includes a client 405 and a relational database system 410, which may be examples of the client and relational database systems described with respect to FIGS. 2 and 3. The relational database system 410 may support a data server as described with respect to FIGS. 2 and 3 and various tenants and clients.

At 415, the relational database system 340 may receive from the client 405, a query for a data object of a first type. The relational database system may be configured to store a plurality of data objects of a second type such that each data object of the second type is associated with a respective data table of a plurality of data tables supported by the relational database system and a respective value of a key prefix of an object identifier field. The key prefix may result in an upper limit of data objects supportable by the relational database system 410. The data object of the first type may be a custom object configured by a developer. The data object of the first type may be associated with entity identifier information, such as a developer name and/or an API name.

At 420, the relational database system 410 may determine that the query is indicative of the data object of the first type. A plurality of data objects of the first type may be associated with a same value of the key prefix by the relational database system 410 such that the upper limit is exceeded. In some examples, the plurality of objects of the first type may be stored in a separate data system.

At 425, the relational database system 410 may identify, based at least in part on determining that the query is indicative of the data object of the first type, entity information corresponding to the data object. Each of the plurality of data objects of the first type may be associated with the same value of the key prefix but different entity information, and each of the plurality of data objects of the second type is associated with a different key prefix value that corresponds to respective entity information. The relational database system 410 may maintain a list or record of data objects, such as data objects of the first type, entity identifier information (e.g., developer name, API name), and associated entity information. Thus, upon receiving a query for the data object of the first type, the relational database system may reference the list to identify the entity information (using the API name or developer name) in order to determine how to retrieve the data associated with the queried data object.

At 430, the relational database system 410 may identify, a result of the query based at least in part on determining that the query is indicative of the data object of the first type. In some cases, the relational database system may identify the result using the entity information associated with the data object. In some cases, the relational database system may determine, based at least in part on determining that the query is indicative of the data object of the first type, that the data object is stored in a separate data system from the relational database system. In such cases, the relational database system 410 may transmit, to the separate data system an application programming interface request that is generated based at least in part on an entity identifier included in the query.

At 430, the relational database system 410 may return, to the client 405, a query response that indicates the result of the query.

Figure 5:
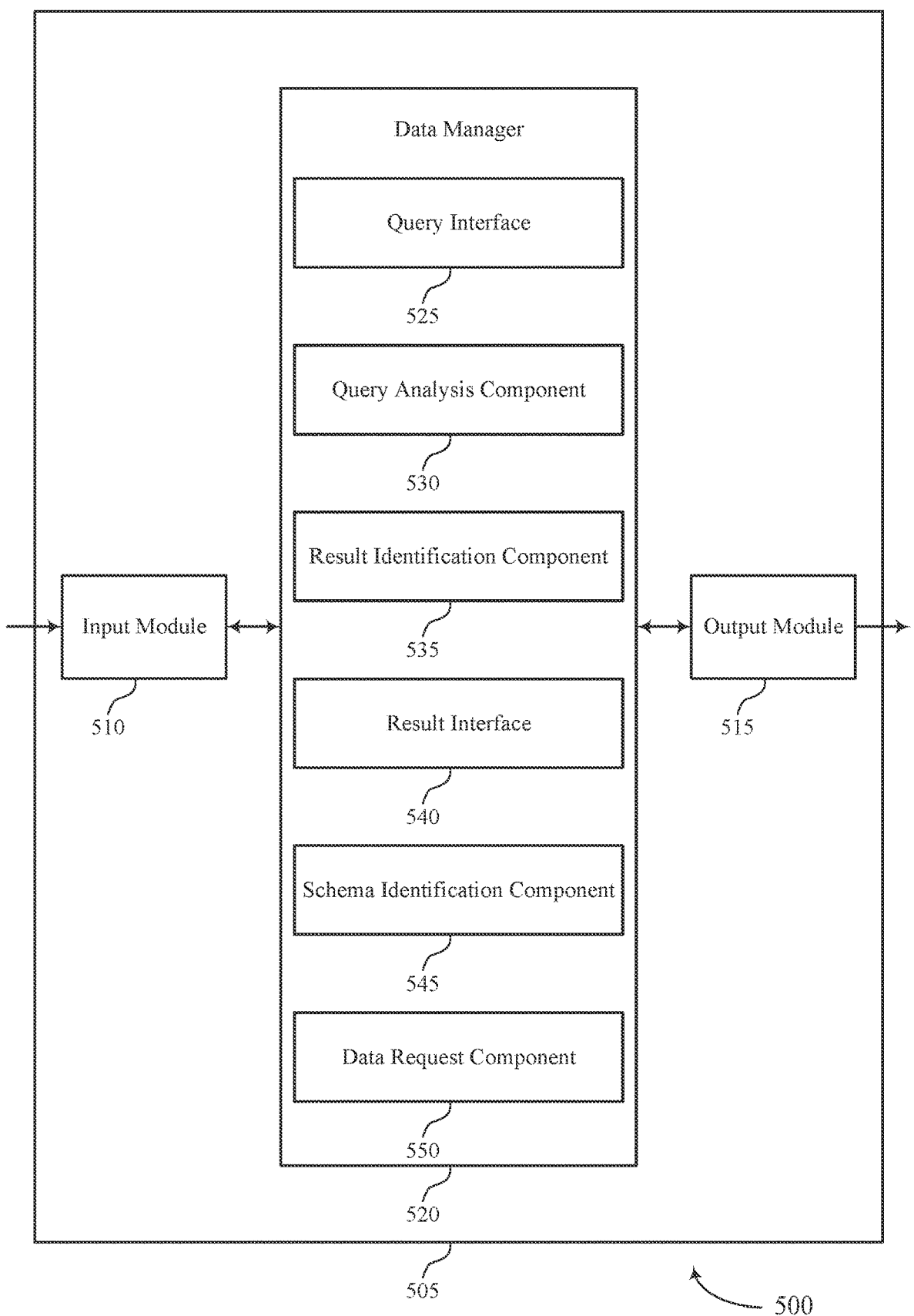
FIG. 5 shows a block diagram of an apparatus that supports shared key prefix values across objects in accordance with aspects of the present disclosure.

FIG. 5 shows a block diagram 500 of a device 505 that supports shared key prefix values across objects in accordance with aspects of the present disclosure. The device 505 may include an input module 510, an output module 515, and a data manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the data manager 520 to support shared key prefix values across objects. In some cases, the input module 510 may be a component of an I/O controller 710 as described with reference to FIG. 7.

The output module 515 may manage output signals for the device 505. For example, the output module 515 may receive signals from other components of the device 505, such as the data manager 520, and may transmit these signals to other components or devices. In some specific examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the data manager 520 may include a query interface 525, a query analysis component 530, a result identification component 535, a result interface 540, a schema identification component 545, a data request component 550, or any combination thereof. In some examples, the data manager 520, or various components thereof, may be configured to perform various operations (e.g., receiving, monitoring, transmitting) using or otherwise in cooperation with the input module 510, the output module 515, or both. For example, the data manager 520 may receive information from the input module 510, send information to the output module 515, or be integrated in combination with the input module 510, the output module 515, or both to receive information, transmit information, or perform various other operations as described herein.

The data manager 520 may support data processing in accordance with examples as disclosed herein. The query interface 525 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The query analysis component 530 may be configured as or otherwise support a means for determining that the query is indicative of the data object of the first type, a plurality of data objects of the first type being associated with a same value of the key prefix by the relational database system such that the upper limit is exceeded. The result identification component 535 may be configured as or otherwise support a means for identifying, a result of the query based at least in part on determining that the query is indicative of the data object of the first type. The result interface 540 may be configured as or otherwise support a means for returning, to the client, a query response that indicates the result of the query.

Additionally or alternatively, the data manager 520 may support data processing in accordance with examples as disclosed herein. The query interface 525 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. The query analysis component 530 may be configured as or otherwise support a means for determining that the query that is supported by the relational database system is indicative of a data object type that is associated with data stored in a data system separate from the relational database system. The schema identification component 545 may be configured as or otherwise support a means for identifying, based at least in part on determining that the query is indicative of the data object type associated with data of the separate data system, a schema of the data object type using a schema record maintained by the relational database system. The data request component 550 may be configured as or otherwise support a means for transmitting, to the separate data system based at least in part on identifying the schema, a request for data associated with the query. The result identification component 535 may be configured as or otherwise support a means for receiving, from the separate data system in response to the request, the requested data. The result interface 540 may be configured as or otherwise support a means for returning, to the client, a query response that indicates the data retrieved from the separate data system.

Figure 6:
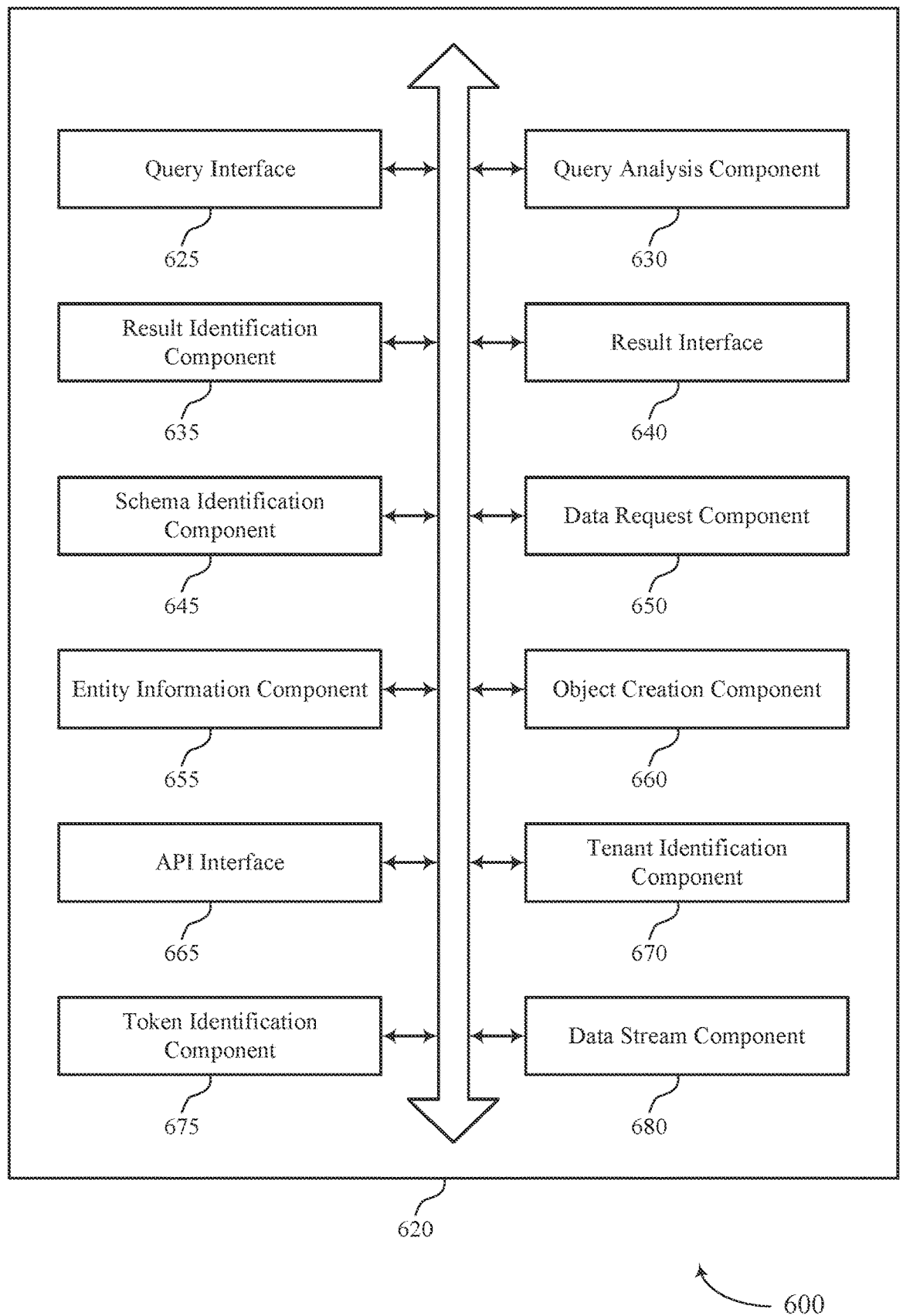
FIG. 6 shows a block diagram of a data manager that supports shared key prefix values across objects in accordance with aspects of the present disclosure.

FIG. 6 shows a block diagram 600 of a data manager 620 that supports shared key prefix values across objects in accordance with aspects of the present disclosure. The data manager 620 may be an example of aspects of a data manager or a data manager 520, or both, as described herein. The data manager 620, or various components thereof, may be an example of means for performing various aspects of shared key prefix values across objects as described herein. For example, the data manager 620 may include a query interface 625, a query analysis component 630, a result identification component 635, a result interface 640, a schema identification component 645, a data request component 650, an entity information component 655, an object creation component 660, an API interface 665, a tenant identification component 670, a token identification component 675, a data stream component 680, or any combination thereof. Each of these components may communicate, directly or indirectly, with one another (e.g., via one or more buses).

The data manager 620 may support data processing in accordance with examples as disclosed herein. The query interface 625 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The query analysis component 630 may be configured as or otherwise support a means for determining that the query is indicative of the data object of the first type, a plurality of data objects of the first type being associated with a same value of the key prefix by the relational database system such that the upper limit is exceeded. The result identification component 635 may be configured as or otherwise support a means for identifying, a result of the query based at least in part on determining that the query is indicative of the data object of the first type. The result interface 640 may be configured as or otherwise support a means for returning, to the client, a query response that indicates the result of the query.

In some examples, the query analysis component 630 may be configured as or otherwise support a means for determining, based at least in part on determining that the query is indicative of the data object of the first type, that the data object is stored in a separate data system from the relational database system, wherein identifying the result of the query includes retrieving the result from the separate data system.

In some examples, to support identifying the result of the query, the API interface 665 may be configured as or otherwise support a means for transmitting, to the separate data system, an application programming interface request that is generated based at least in part on an entity identifier included in the query.

In some examples, the entity information component 655 may be configured as or otherwise support a means for identifying, based at least in part on determining that the query is indicative of the data object of the first type, entity information corresponding to the data object, wherein each of the plurality of data objects of the first type is associated with the same value of the key prefix but different entity information and wherein each of the plurality of data objects of the second type is associated with a different key prefix value that corresponds to respective entity information. In some examples, the result identification component 635 may be configured as or otherwise support a means for identifying the result of the query based at least in part on the identified entity information for the data object.

In some examples, the object creation component 660 may be configured as or otherwise support a means for receiving, at the relational database system, a request to create the data object of the first type, wherein the request includes an entity name corresponding to the data object. In some examples, the object creation component 660 may be configured as or otherwise support a means for causing a data table corresponding to the data object to be generated at a separate data system from the relational database system, each data object of the first type associated with a respective data table in the separate data system.

In some examples, the object creation component 660 may be configured as or otherwise support a means for associating the same value of the key prefix with the data object such data tables at the separate data system are configured to use the same value of the key prefix for the plurality of data objects of the first type, wherein the data object is identifiable from the separate data system based at least in part on the entity name corresponding to the data object.

In some examples, to support determining that the query is indicative of the data object of the first type, the query analysis component 630 may be configured as or otherwise support a means for identifying that the query includes an object suffix that indicates that the data object is of the first type.

Additionally or alternatively, the data manager 620 may support data processing in accordance with examples as disclosed herein. In some examples, the query interface 625 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. In some examples, the query analysis component 630 may be configured as or otherwise support a means for determining that the query that is supported by the relational database system is indicative of a data object type that is associated with data stored in a data system separate from the relational database system. The schema identification component 645 may be configured as or otherwise support a means for identifying, based at least in part on determining that the query is indicative of the data object type associated with data of the separate data system, a schema of the data object type using a schema record maintained by the relational database system. The data request component 650 may be configured as or otherwise support a means for transmitting, to the separate data system based at least in part on identifying the schema, a request for data associated with the query. In some examples, the result identification component 635 may be configured as or otherwise support a means for receiving, from the separate data system in response to the request, the requested data. In some examples, the result interface 640 may be configured as or otherwise support a means for returning, to the client, a query response that indicates the data retrieved from the separate data system.

In some examples, the object creation component 660 may be configured as or otherwise support a means for receiving, at the relational database system, a request to create the data object of the data object type. In some examples, the object creation component 660 may be configured as or otherwise support a means for generating the schema of the data object type based at least in part on receiving the request. In some examples, the object creation component 660 may be configured as or otherwise support a means for transmitting, to the separate data system, an indication of the schema such that the separate data system is configured to ingest data corresponding to the data object type.

In some examples, to support generating the schema, the object creation component 660 may be configured as or otherwise support a means for receiving an indication of one or more columns to adjust for ingesting data corresponding to the data object type. In some examples, to support generating the schema, the data stream component 680 may be configured as or otherwise support a means for generating a data stream process based at least in part on receiving the indication, wherein the data stream process is configured to execute at the separate data system for ingesting data of the data object type.

In some examples, to support transmitting the request for the data, the API interface 665 may be configured as or otherwise support a means for transmitting, to the separate data system, an application programming interface request that is generated based at least in part on an entity identifier included in the query.

In some examples, the tenant identification component 670 may be configured as or otherwise support a means for identifying, based at least in part on the query, a tenant of a plurality of tenants supported by the relational database system. In some examples, the token identification component 675 may be configured as or otherwise support a means for identifying a token that is associated with the identified tenant is to be used for authenticating the request to the separate data system, wherein the token is transmitted with the request such that the request is authenticated.

In some examples, the entity information component 655 may be configured as or otherwise support a means for identifying, based at least in part on determining that the query is indicative of the data object type associated with data stored in the separate data system, entity information associated with the data object. In some examples, the schema identification component 645 may be configured as or otherwise support a means for identifying the schema of the data object type based at least in part on the entity information.

In some examples, to support determining that the query is indicative of the data object type, the query analysis component 630 may be configured as or otherwise support a means for identifying that the query includes an object suffix that indicates that the data object is of the data object type that is associated with the data stored in the separate data system.

In some examples, the separate data system is a non-relational database system.

Figure 7:
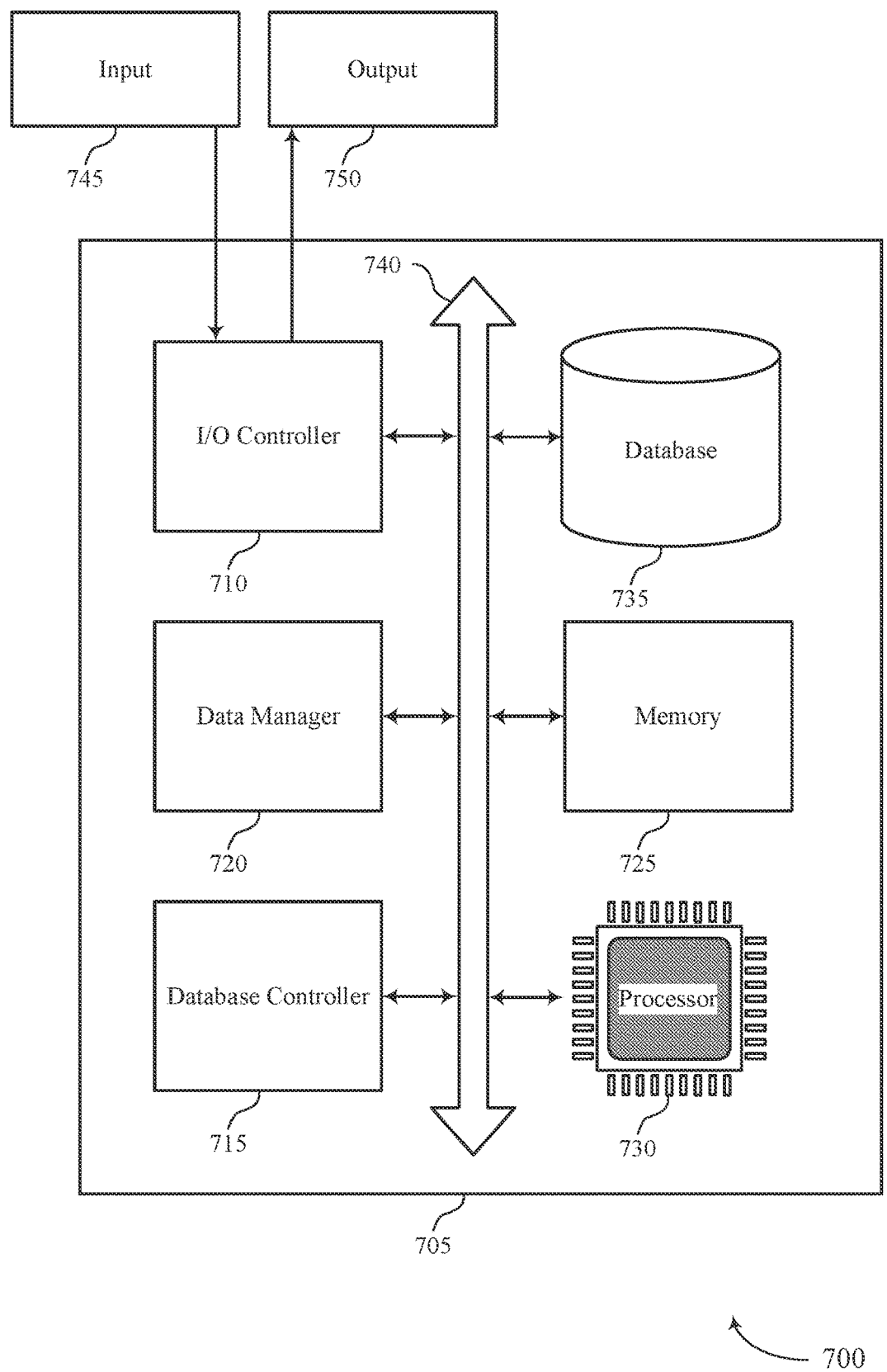
FIG. 7 shows a diagram of a system including a device that supports shared key prefix values across objects in accordance with aspects of the present disclosure.

FIG. 7 shows a diagram of a system 700 including a device 705 that supports shared key prefix values across objects in accordance with aspects of the present disclosure. The device 705 may be an example of or include the components of a device 505 as described herein. The device 705 may include components for bi-directional data communications including components for transmitting and receiving communications, such as a data manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor. In some cases, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a CPU, a microcontroller, an ASIC, an field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting shared key prefix values across objects).

The data manager 720 may support data processing in accordance with examples as disclosed herein. For example, the data manager 720 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The data manager 720 may be configured as or otherwise support a means for determining that the query is indicative of the data object of the first type, a plurality of data objects of the first type being associated with a same value of the key prefix by the relational database system such that the upper limit is exceeded. The data manager 720 may be configured as or otherwise support a means for identifying, a result of the query based at least in part on determining that the query is indicative of the data object of the first type. The data manager 720 may be configured as or otherwise support a means for returning, to the client, a query response that indicates the result of the query.

Additionally or alternatively, the data manager 720 may support data processing in accordance with examples as disclosed herein. For example, the data manager 720 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. The data manager 720 may be configured as or otherwise support a means for determining that the query that is supported by the relational database system is indicative of a data object type that is associated with data stored in a data system separate from the relational database system. The data manager 720 may be configured as or otherwise support a means for identifying, based at least in part on determining that the query is indicative of the data object type associated with data of the separate data system, a schema of the data object type using a schema record maintained by the relational database system. The data manager 720 may be configured as or otherwise support a means for transmitting, to the separate data system based at least in part on identifying the schema, a request for data associated with the query. The data manager 720 may be configured as or otherwise support a means for receiving, from the separate data system in response to the request, the requested data. The data manager 720 may be configured as or otherwise support a means for returning, to the client, a query response that indicates the data retrieved from the separate data system.

Figure 8:
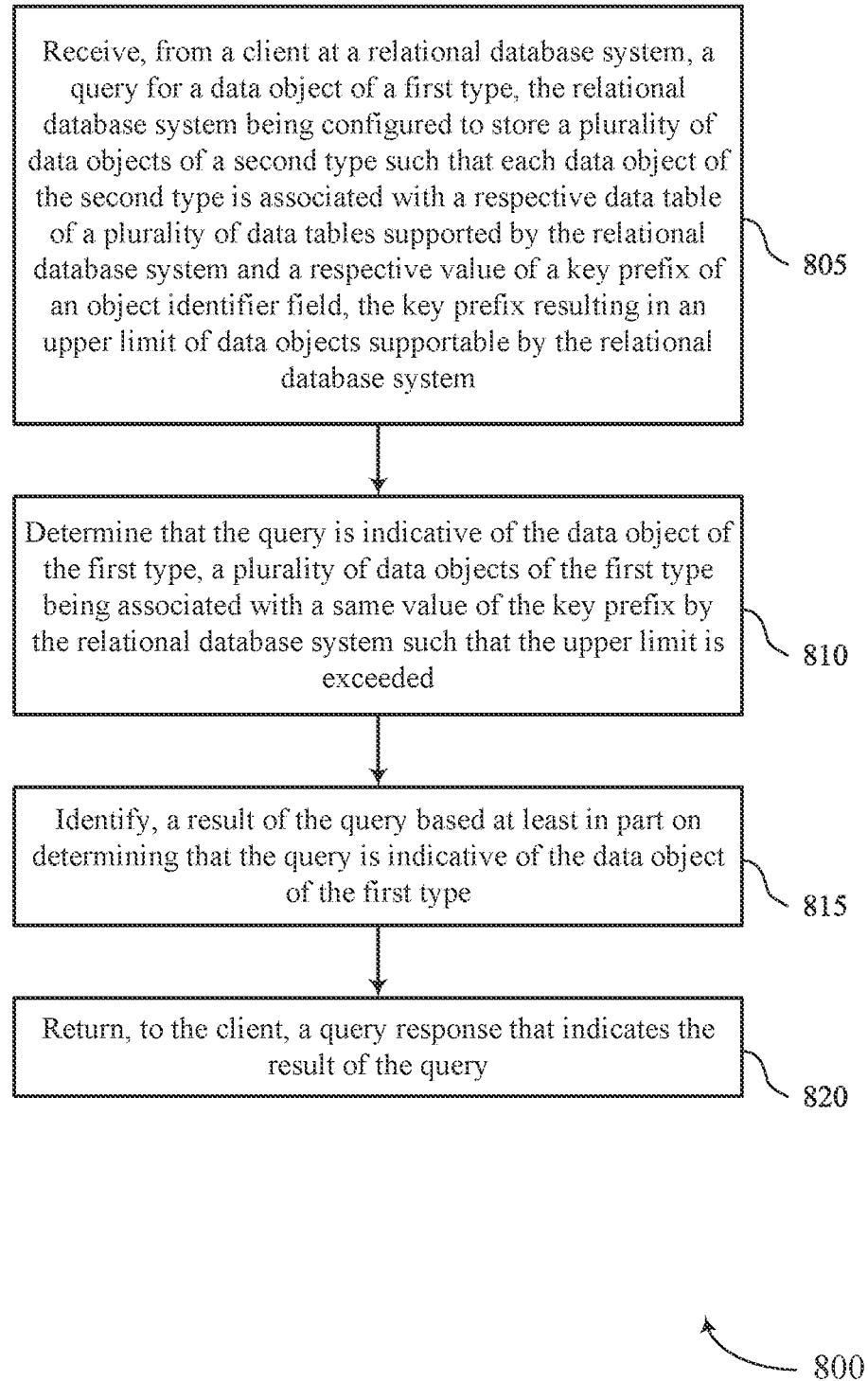
FIGS. 8 through 13 show flowcharts illustrating methods that support shared key prefix values across objects in accordance with aspects of the present disclosure.

FIG. 8 shows a flowchart illustrating a method 800 that supports shared key prefix values across objects in accordance with aspects of the present disclosure. The operations of the method 800 may be implemented by a Data server or its components as described herein. For example, the operations of the method 800 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 805, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 805 may be performed in accordance with examples as disclosed herein. In some examples, aspects of the operations of 805 may be performed by a query interface 625 as described with reference to FIG. 6.

At 810, the method may include determining that the query is indicative of the data object of the first type, a plurality of data objects of the first type being associated with a same value of the key prefix by the relational database system such that the upper limit is exceeded. The operations of 810 may be performed in accordance with examples as disclosed herein. In some examples, aspects of the operations of 810 may be performed by a query analysis component 630 as described with reference to FIG. 6.

At 815, the method may include identifying, a result of the query based at least in part on determining that the query is indicative of the data object of the first type. The operations of 815 may be performed in accordance with examples as disclosed herein. In some examples, aspects of the operations of 815 may be performed by a result identification component 635 as described with reference to FIG. 6.

At 820, the method may include returning, to the client, a query response that indicates the result of the query. The operations of 820 may be performed in accordance with examples as disclosed herein. In some examples, aspects of the operations of 820 may be performed by a result interface 640 as described with reference to FIG. 6.

Figure 9:
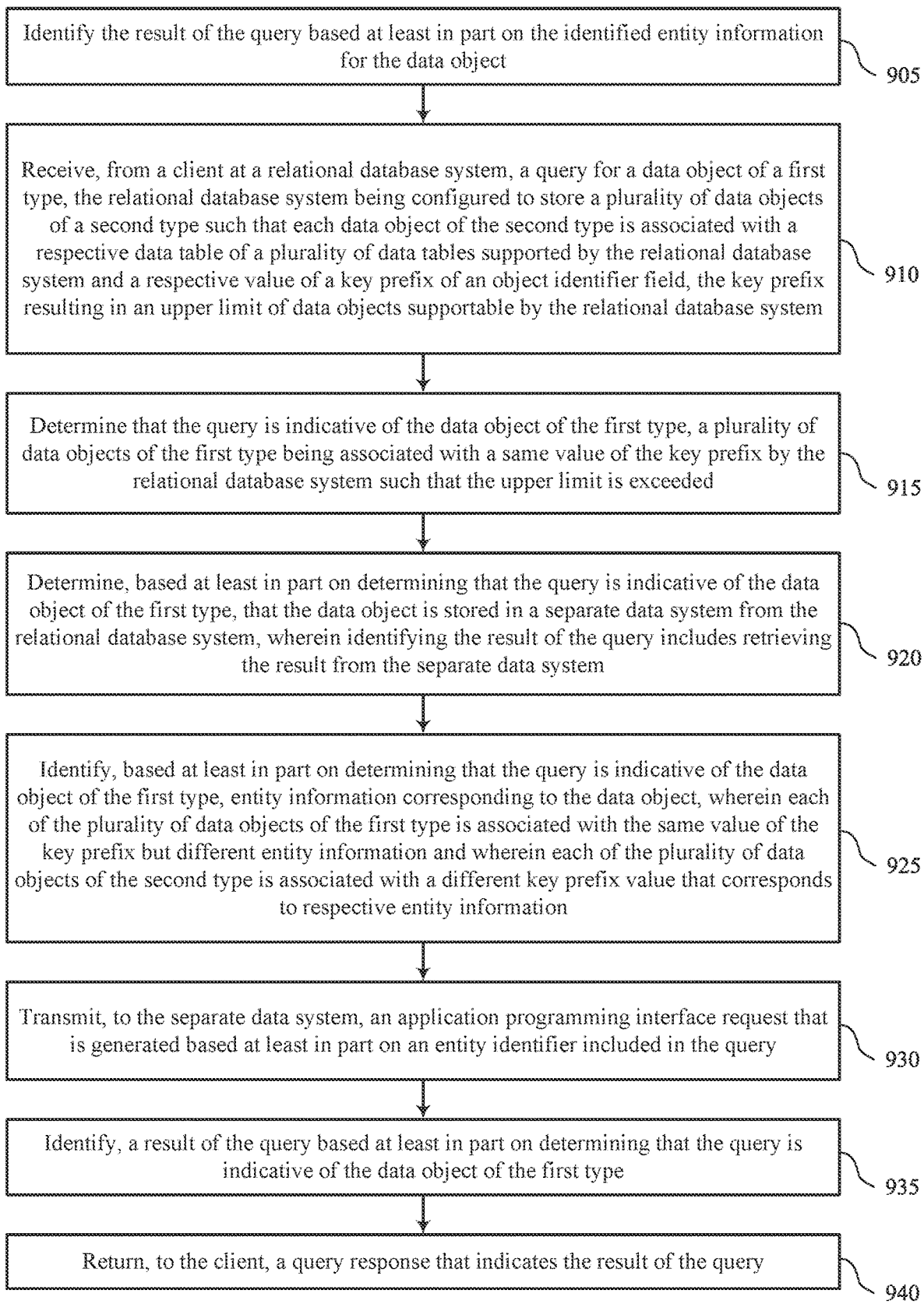

FIG. 9 shows a flowchart illustrating a method 900 that supports shared key prefix values across objects in accordance with aspects of the present disclosure. The operations of the method 900 may be implemented by a Data server or its components as described herein. For example, the operations of the method 900 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 905, the method may include identifying the result of the query based at least in part on the identified entity information for the data object. The operations of 905 may be performed in accordance with examples as disclosed herein. In some examples, aspects of the operations of 905 may be performed by a result identification component 635 as described with reference to FIG. 6.

At 910, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 910 may be performed in accordance with examples as disclosed herein. In some examples, aspects of the operations of 910 may be performed by a query interface 625 as described with reference to FIG. 6.

At 915, the method may include determining that the query is indicative of the data object of the first type, a plurality of data objects of the first type being associated with a same value of the key prefix by the relational database system such that the upper limit is exceeded. The operations of 915 may be performed in accordance with examples as disclosed herein. In some examples, aspects of the operations of 915 may be performed by a query analysis component 630 as described with reference to FIG. 6.

At 920, the method may include determining, based at least in part on determining that the query is indicative of the data object of the first type, that the data object is stored in a separate data system from the relational database system, wherein identifying the result of the query includes retrieving the result from the separate data system. The operations of 920 may be performed in accordance with examples as disclosed herein. In some examples, aspects of the operations of 920 may be performed by a query analysis component 630 as described with reference to FIG. 6.

At 925, the method may include identifying, based at least in part on determining that the query is indicative of the data object of the first type, entity information corresponding to the data object, wherein each of the plurality of data objects of the first type is associated with the same value of the key prefix but different entity information and wherein each of the plurality of data objects of the second type is associated with a different key prefix value that corresponds to respective entity information. The operations of 925 may be performed in accordance with examples as disclosed herein. In some examples, aspects of the operations of 925 may be performed by an entity information component 655 as described with reference to FIG. 6.

At 930, the method may include transmitting, to the separate data system, an application programming interface request that is generated based at least in part on an entity identifier included in the query. The operations of 930 may be performed in accordance with examples as disclosed herein. In some examples, aspects of the operations of 930 may be performed by an API interface 665 as described with reference to FIG. 6.

At 935, the method may include identifying, a result of the query based at least in part on determining that the query is indicative of the data object of the first type. The operations of 935 may be performed in accordance with examples as disclosed herein. In some examples, aspects of the operations of 935 may be performed by a result identification component 635 as described with reference to FIG. 6.

At 940, the method may include returning, to the client, a query response that indicates the result of the query. The operations of 940 may be performed in accordance with examples as disclosed herein. In some examples, aspects of the operations of 940 may be performed by a result interface 640 as described with reference to FIG. 6.

Figure 10:
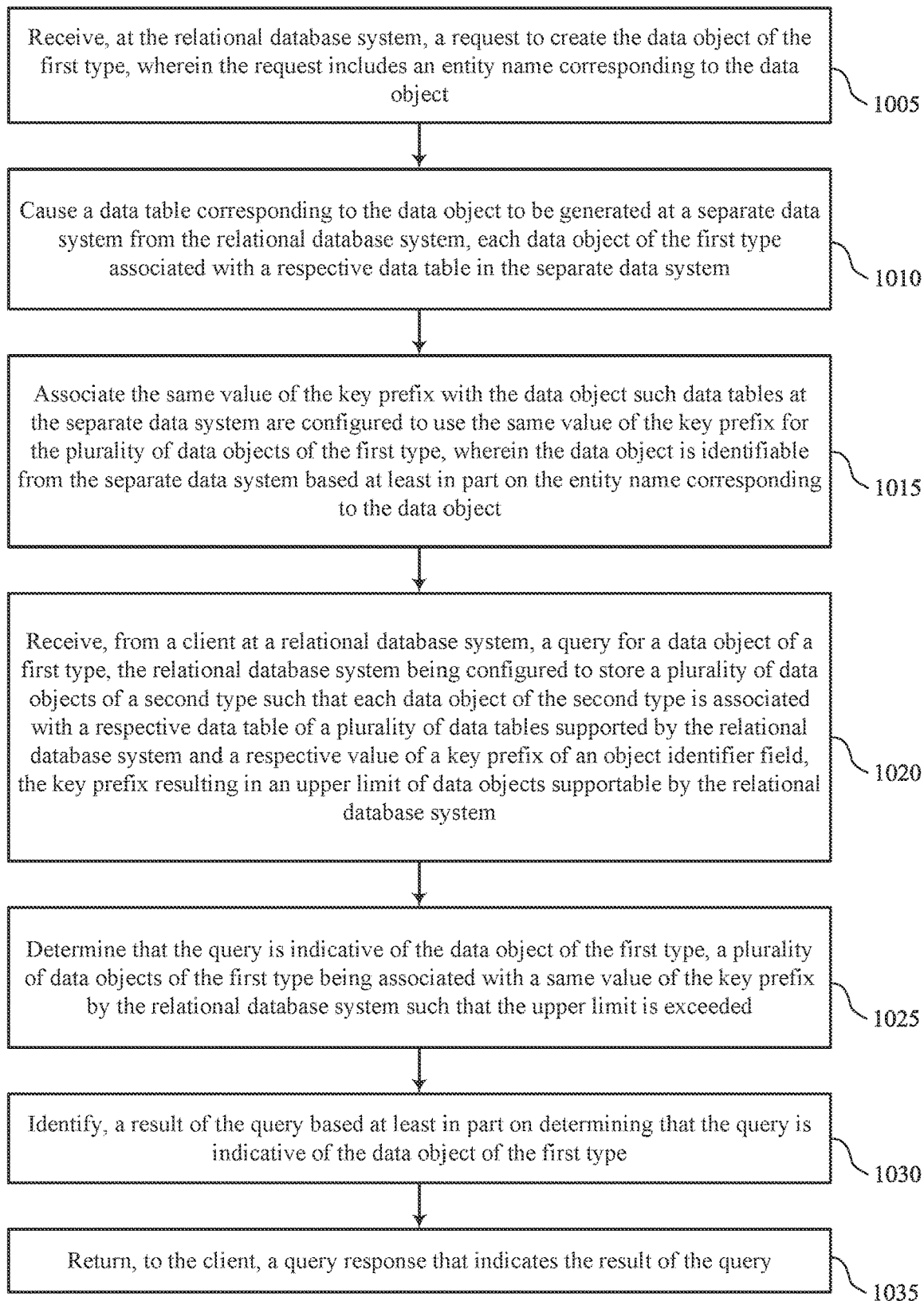

FIG. 10 shows a flowchart illustrating a method 1000 that supports shared key prefix values across objects in accordance with aspects of the present disclosure. The operations of the method 1000 may be implemented by a Data server or its components as described herein. For example, the operations of the method 1000 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 1005, the method may include receiving, at the relational database system, a request to create the data object of the first type, wherein the request includes an entity name corresponding to the data object. The operations of 1005 may be performed in accordance with examples as disclosed herein. In some examples, aspects of the operations of 1005 may be performed by an object creation component 660 as described with reference to FIG. 6.

At 1010, the method may include causing a data table corresponding to the data object to be generated at a separate data system from the relational database system, each data object of the first type associated with a respective data table in the separate data system. The operations of 1010 may be performed in accordance with examples as disclosed herein. In some examples, aspects of the operations of 1010 may be performed by an object creation component 660 as described with reference to FIG. 6.

At 1015, the method may include associating the same value of the key prefix with the data object such data tables at the separate data system are configured to use the same value of the key prefix for the plurality of data objects of the first type, wherein the data object is identifiable from the separate data system based at least in part on the entity name corresponding to the data object. The operations of 1015 may be performed in accordance with examples as disclosed herein. In some examples, aspects of the operations of 1015 may be performed by an object creation component 660 as described with reference to FIG. 6.

At 1020, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 1020 may be performed in accordance with examples as disclosed herein. In some examples, aspects of the operations of 1020 may be performed by a query interface 625 as described with reference to FIG. 6.

At 1025, the method may include determining that the query is indicative of the data object of the first type, a plurality of data objects of the first type being associated with a same value of the key prefix by the relational database system such that the upper limit is exceeded. The operations of 1025 may be performed in accordance with examples as disclosed herein. In some examples, aspects of the operations of 1025 may be performed by a query analysis component 630 as described with reference to FIG. 6.

At 1030, the method may include identifying, a result of the query based at least in part on determining that the query is indicative of the data object of the first type. The operations of 1030 may be performed in accordance with examples as disclosed herein. In some examples, aspects of the operations of 1030 may be performed by a result identification component 635 as described with reference to FIG. 6.

At 1035, the method may include returning, to the client, a query response that indicates the result of the query. The operations of 1035 may be performed in accordance with examples as disclosed herein. In some examples, aspects of the operations of 1035 may be performed by a result interface 640 as described with reference to FIG. 6.

Figure 11:
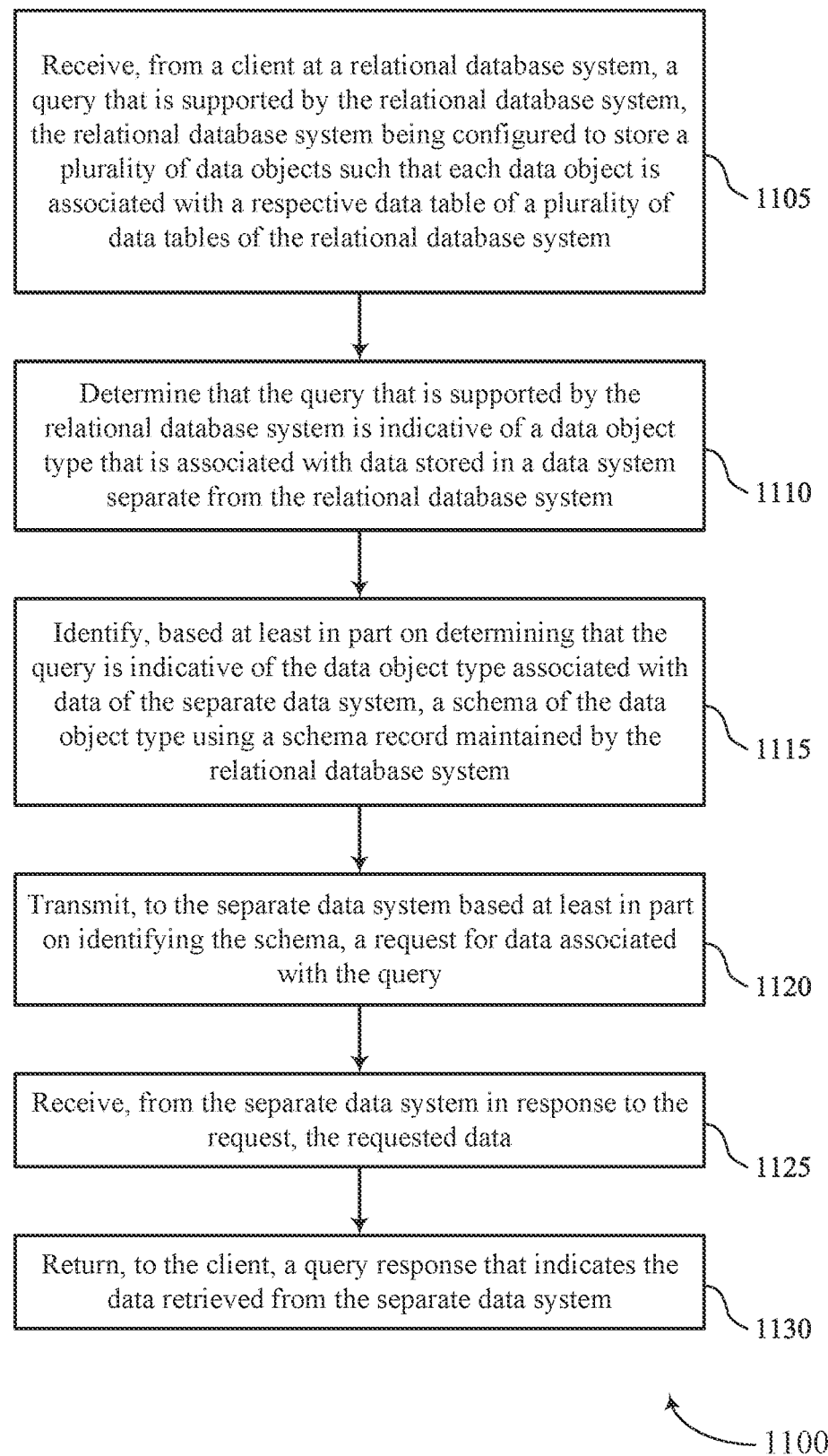

FIG. 11 shows a flowchart illustrating a method 1100 that supports shared key prefix values across objects in accordance with aspects of the present disclosure. The operations of the method 1100 may be implemented by a Data server or its components as described herein. For example, the operations of the method 1100 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 1105, the method may include receiving, from a client at a relational database system, a query that is supported by the relational database system, the relational database system being configured to store a plurality of data objects such that each data object is associated with a respective data table of a plurality of data tables of the relational database system. The operations of 1105 may be performed in accordance with examples as disclosed herein. In some examples, aspects of the operations of 1105 may be performed by a query interface 625 as described with reference to FIG. 6.

At 1110, the method may include determining that the query that is supported by the relational database system is indicative of a data object type that is associated with data stored in a data system separate from the relational database system. The operations of 1110 may be performed in accordance with examples as disclosed herein. In some examples, aspects of the operations of 1110 may be performed by a query analysis component 630 as described with reference to FIG. 6.

At 1115, the method may include identifying, based at least in part on determining that the query is indicative of the data object type associated with data of the separate data system, a schema of the data object type using a schema record maintained by the relational database system. The operations of 1115 may be performed in accordance with examples as disclosed herein. In some examples, aspects of the operations of 1115 may be performed by a schema identification component 645 as described with reference to FIG. 6.

At 1120, the method may include transmitting, to the separate data system based at least in part on identifying the schema, a request for data associated with the query. The operations of 1120 may be performed in accordance with examples as disclosed herein. In some examples, aspects of the operations of 1120 may be performed by a data request component 650 as described with reference to FIG. 6.

At 1125, the method may include receiving, from the separate data system in response to the request, the requested data. The operations of 1125 may be performed in accordance with examples as disclosed herein. In some examples, aspects of the operations of 1125 may be performed by a result identification component 635 as described with reference to FIG. 6.

At 1130, the method may include returning, to the client, a query response that indicates the data retrieved from the separate data system. The operations of 1130 may be performed in accordance with examples as disclosed herein. In some examples, aspects of the operations of 1130 may be performed by a result interface 640 as described with reference to FIG. 6.

Figure 12:
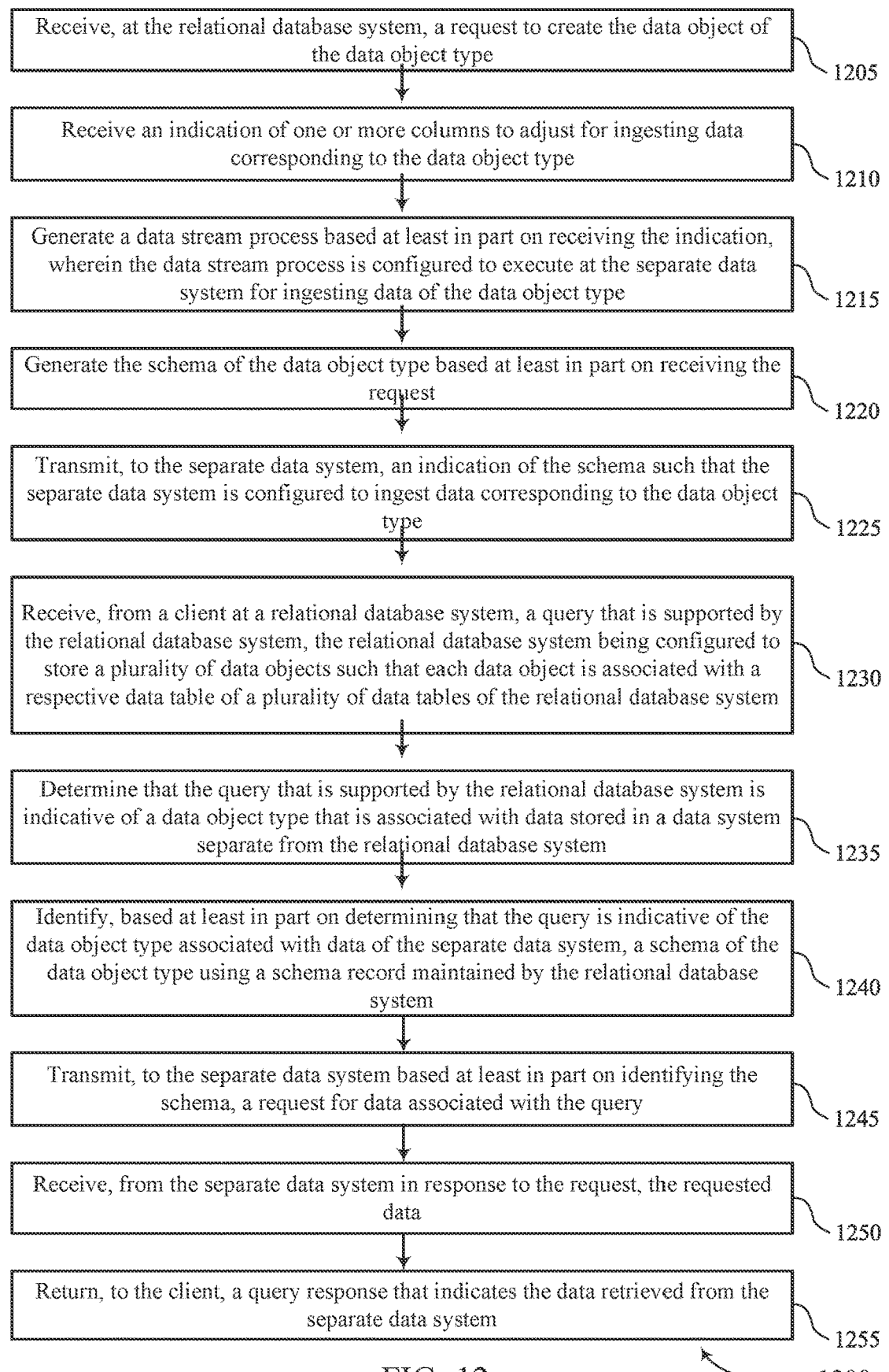

FIG. 12 shows a flowchart illustrating a method 1200 that supports shared key prefix values across objects in accordance with aspects of the present disclosure. The operations of the method 1200 may be implemented by a Data server or its components as described herein. For example, the operations of the method 1200 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 1205, the method may include receiving, at the relational database system, a request to create the data object of the data object type. The operations of 1205 may be performed in accordance with examples as disclosed herein. In some examples, aspects of the operations of 1205 may be performed by an object creation component 660 as described with reference to FIG. 6.

At 1210, the method may include receiving an indication of one or more columns to adjust for ingesting data corresponding to the data object type. The operations of 1210 may be performed in accordance with examples as disclosed herein. In some examples, aspects of the operations of 1210 may be performed by an object creation component 660 as described with reference to FIG. 6.

At 1215, the method may include generating a data stream process based at least in part on receiving the indication, wherein the data stream process is configured to execute at the separate data system for ingesting data of the data object type. The operations of 1215 may be performed in accordance with examples as disclosed herein. In some examples, aspects of the operations of 1215 may be performed by a data stream component 680 as described with reference to FIG. 6.

At 1220, the method may include generating the schema of the data object type based at least in part on receiving the request. The operations of 1220 may be performed in accordance with examples as disclosed herein. In some examples, aspects of the operations of 1220 may be performed by an object creation component 660 as described with reference to FIG. 6.

At 1225, the method may include transmitting, to the separate data system, an indication of the schema such that the separate data system is configured to ingest data corresponding to the data object type. The operations of 1225 may be performed in accordance with examples as disclosed herein. In some examples, aspects of the operations of 1225 may be performed by an object creation component 660 as described with reference to FIG. 6.

At 1230, the method may include receiving, from a client at a relational database system, a query that is supported by the relational database system, the relational database system being configured to store a plurality of data objects such that each data object is associated with a respective data table of a plurality of data tables of the relational database system. The operations of 1230 may be performed in accordance with examples as disclosed herein. In some examples, aspects of the operations of 1230 may be performed by a query interface 625 as described with reference to FIG. 6.

At 1235, the method may include determining that the query that is supported by the relational database system is indicative of a data object type that is associated with data stored in a data system separate from the relational database system. The operations of 1235 may be performed in accordance with examples as disclosed herein. In some examples, aspects of the operations of 1235 may be performed by a query analysis component 630 as described with reference to FIG. 6.

At 1240, the method may include identifying, based at least in part on determining that the query is indicative of the data object type associated with data of the separate data system, a schema of the data object type using a schema record maintained by the relational database system. The operations of 1240 may be performed in accordance with examples as disclosed herein. In some examples, aspects of the operations of 1240 may be performed by a schema identification component 645 as described with reference to FIG. 6.

At 1245, the method may include transmitting, to the separate data system based at least in part on identifying the schema, a request for data associated with the query. The operations of 1245 may be performed in accordance with examples as disclosed herein. In some examples, aspects of the operations of 1245 may be performed by a data request component 650 as described with reference to FIG. 6.

At 1250, the method may include receiving, from the separate data system in response to the request, the requested data. The operations of 1250 may be performed in accordance with examples as disclosed herein. In some examples, aspects of the operations of 1250 may be performed by a result identification component 635 as described with reference to FIG. 6.

At 1255, the method may include returning, to the client, a query response that indicates the data retrieved from the separate data system. The operations of 1255 may be performed in accordance with examples as disclosed herein. In some examples, aspects of the operations of 1255 may be performed by a result interface 640 as described with reference to FIG. 6.

Figure 13:
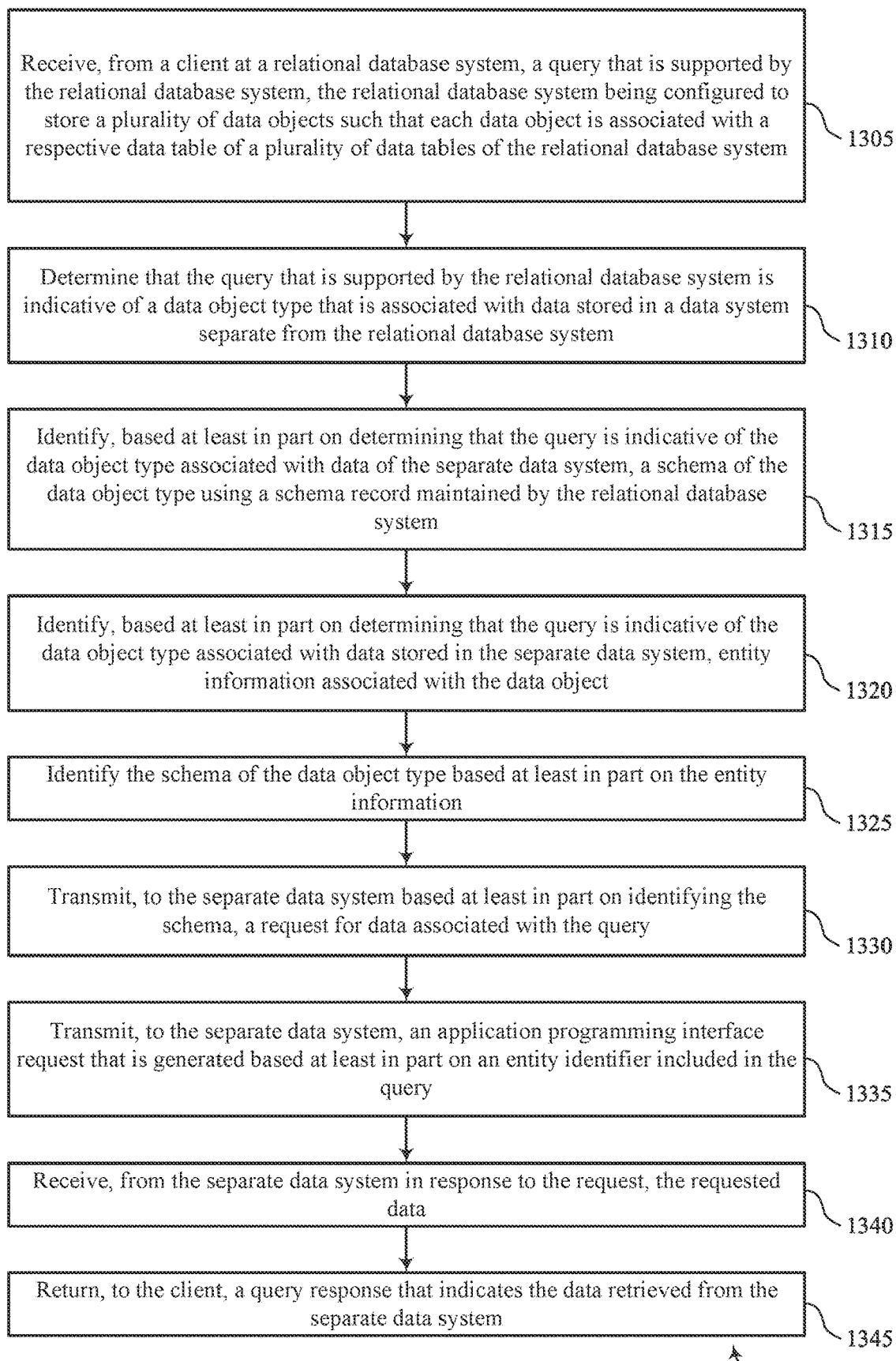

FIG. 13 shows a flowchart illustrating a method 1300 that supports shared key prefix values across objects in accordance with aspects of the present disclosure. The operations of the method 1300 may be implemented by a Data server or its components as described herein. For example, the operations of the method 1300 may be performed by a Data server as described with reference to FIGS. 1 through 7. In some examples, a Data server may execute a set of instructions to control the functional elements of the Data server to perform the described functions. Additionally or alternatively, the Data server may perform aspects of the described functions using special-purpose hardware.

At 1305, the method may include receiving, from a client at a relational database system, a query that is supported by the relational database system, the relational database system being configured to store a plurality of data objects such that each data object is associated with a respective data table of a plurality of data tables of the relational database system. The operations of 1305 may be performed in accordance with examples as disclosed herein. In some examples, aspects of the operations of 1305 may be performed by a query interface 625 as described with reference to FIG. 6.

At 1310, the method may include determining that the query that is supported by the relational database system is indicative of a data object type that is associated with data stored in a data system separate from the relational database system. The operations of 1310 may be performed in accordance with examples as disclosed herein. In some examples, aspects of the operations of 1310 may be performed by a query analysis component 630 as described with reference to FIG. 6.

At 1315, the method may include identifying, based at least in part on determining that the query is indicative of the data object type associated with data of the separate data system, a schema of the data object type using a schema record maintained by the relational database system. The operations of 1315 may be performed in accordance with examples as disclosed herein. In some examples, aspects of the operations of 1315 may be performed by a schema identification component 645 as described with reference to FIG. 6.

At 1320, the method may include identifying, based at least in part on determining that the query is indicative of the data object type associated with data stored in the separate data system, entity information associated with the data object. The operations of 1320 may be performed in accordance with examples as disclosed herein. In some examples, aspects of the operations of 1320 may be performed by an entity information component 655 as described with reference to FIG. 6.

At 1325, the method may include identifying the schema of the data object type based at least in part on the entity information. The operations of 1325 may be performed in accordance with examples as disclosed herein. In some examples, aspects of the operations of 1325 may be performed by a schema identification component 645 as described with reference to FIG. 6.

At 1330, the method may include transmitting, to the separate data system based at least in part on identifying the schema, a request for data associated with the query. The operations of 1330 may be performed in accordance with examples as disclosed herein. In some examples, aspects of the operations of 1330 may be performed by a data request component 650 as described with reference to FIG. 6.

At 1335, the method may include transmitting, to the separate data system, an application programming interface request that is generated based at least in part on an entity identifier included in the query. The operations of 1335 may be performed in accordance with examples as disclosed herein. In some examples, aspects of the operations of 1335 may be performed by an API interface 665 as described with reference to FIG. 6.

At 1340, the method may include receiving, from the separate data system in response to the request, the requested data. The operations of 1340 may be performed in accordance with examples as disclosed herein. In some examples, aspects of the operations of 1340 may be performed by a result identification component 635 as described with reference to FIG. 6.

At 1345, the method may include returning, to the client, a query response that indicates the data retrieved from the separate data system. The operations of 1345 may be performed in accordance with examples as disclosed herein. In some examples, aspects of the operations of 1345 may be performed by a result interface 640 as described with reference to FIG. 6.

A method for data processing is described. The method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determining that the query is indicative of the data object of the first type, a plurality of data objects of the first type being associated with a same value of the key prefix by the relational database system such that the upper limit is exceeded, identifying, a result of the query based at least in part on determining that the query is indicative of the data object of the first type, and returning, to the client, a query response that indicates the result of the query.

An apparatus for data processing is described. The apparatus may include a processor, memory coupled with the processor, and instructions stored in the memory. The instructions may be executable by the processor to cause the apparatus to receive, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determine that the query is indicative of the data object of the first type, a plurality of data objects of the first type being associated with a same value of the key prefix by the relational database system such that the upper limit is exceeded, identify, a result of the query based at least in part on determining that the query is indicative of the data object of the first type, and return, to the client, a query response that indicates the result of the query.

Another apparatus for data processing is described. The apparatus may include means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, means for determining that the query is indicative of the data object of the first type, a plurality of data objects of the first type being associated with a same value of the key prefix by the relational database system such that the upper limit is exceeded, means for identifying, a result of the query based at least in part on determining that the query is indicative of the data object of the first type, and means for returning, to the client, a query response that indicates the result of the query.

A non-transitory computer-readable medium storing code for data processing is described. The code may include instructions executable by a processor to receive, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determine that the query is indicative of the data object of the first type, a plurality of data objects of the first type being associated with a same value of the key prefix by the relational database system such that the upper limit is exceeded, identify, a result of the query based at least in part on determining that the query is indicative of the data object of the first type, and return, to the client, a query response that indicates the result of the query.

Some examples of the method, apparatuses, and non-transitory computer-readable medium described herein may further include operations, features, means, or instructions for determining, based at least in part on determining that the query may be indicative of the data object of the first type, that the data object may be stored in a separate data system from the relational database system, wherein identifying the result of the query includes retrieving the result from the separate data system.

In some examples of the method, apparatuses, and non-transitory computer-readable medium described herein, identifying the result of the query may include operations, features, means, or instructions for transmitting, to the separate data system, an application programming interface request that may be generated based at least in part on an entity identifier included in the query.

Some examples of the method, apparatuses, and non-transitory computer-readable medium described herein may further include operations, features, means, or instructions for identifying, based at least in part on determining that the query may be indicative of the data object of the first type, entity information corresponding to the data object, wherein each of the plurality of data objects of the first type may be associated with the same value of the key prefix but different entity information and wherein each of the plurality of data objects of the second type may be associated with a different key prefix value that corresponds to respective entity information and identifying the result of the query based at least in part on the identified entity information for the data object.

Some examples of the method, apparatuses, and non-transitory computer-readable medium described herein may further include operations, features, means, or instructions for receiving, at the relational database system, a request to create the data object of the first type, wherein the request includes an entity name corresponding to the data object and causing a data table corresponding to the data object to be generated at a separate data system from the relational database system, each data object of the first type associated with a respective data table in the separate data system.

Some examples of the method, apparatuses, and non-transitory computer-readable medium described herein may further include operations, features, means, or instructions for associating the same value of the key prefix with the data object such data tables at the separate data system may be configured to use the same value of the key prefix for the plurality of data objects of the first type, wherein the data object may be identifiable from the separate data system based at least in part on the entity name corresponding to the data object.

In some examples of the method, apparatuses, and non-transitory computer-readable medium described herein, determining that the query may be indicative of the data object of the first type may include operations, features, means, or instructions for identifying that the query includes an object suffix that indicates that the data object may be of the first type.

A method for data processing is described. The method may include receiving, from a client at a relational database system, a query that is supported by the relational database system, the relational database system being configured to store a plurality of data objects such that each data object is associated with a respective data table of a plurality of data tables of the relational database system, determining that the query that is supported by the relational database system is indicative of a data object type that is associated with data stored in a data system separate from the relational database system, identifying, based at least in part on determining that the query is indicative of the data object type associated with data of the separate data system, a schema of the data object type using a schema record maintained by the relational database system, transmitting, to the separate data system based at least in part on identifying the schema, a request for data associated with the query, receiving, from the separate data system in response to the request, the requested data, and returning, to the client, a query response that indicates the data retrieved from the separate data system.

An apparatus for data processing is described. The apparatus may include a processor, memory coupled with the processor, and instructions stored in the memory. The instructions may be executable by the processor to cause the apparatus to receive, from a client at a relational database system, a query that is supported by the relational database system, the relational database system being configured to store a plurality of data objects such that each data object is associated with a respective data table of a plurality of data tables of the relational database system, determine that the query that is supported by the relational database system is indicative of a data object type that is associated with data stored in a data system separate from the relational database system, identify, based at least in part on determining that the query is indicative of the data object type associated with data of the separate data system, a schema of the data object type using a schema record maintained by the relational database system, transmit, to the separate data system based at least in part on identifying the schema, a request for data associated with the query, receive, from the separate data system in response to the request, the requested data, and return, to the client, a query response that indicates the data retrieved from the separate data system.

Another apparatus for data processing is described. The apparatus may include means for receiving, from a client at a relational database system, a query that is supported by the relational database system, the relational database system being configured to store a plurality of data objects such that each data object is associated with a respective data table of a plurality of data tables of the relational database system, means for determining that the query that is supported by the relational database system is indicative of a data object type that is associated with data stored in a data system separate from the relational database system, means for identifying, based at least in part on determining that the query is indicative of the data object type associated with data of the separate data system, a schema of the data object type using a schema record maintained by the relational database system, means for transmitting, to the separate data system based at least in part on identifying the schema, a request for data associated with the query, means for receiving, from the separate data system in response to the request, the requested data, and means for returning, to the client, a query response that indicates the data retrieved from the separate data system.

A non-transitory computer-readable medium storing code for data processing is described. The code may include instructions executable by a processor to receive, from a client at a relational database system, a query that is supported by the relational database system, the relational database system being configured to store a plurality of data objects such that each data object is associated with a respective data table of a plurality of data tables of the relational database system, determine that the query that is supported by the relational database system is indicative of a data object type that is associated with data stored in a data system separate from the relational database system, identify, based at least in part on determining that the query is indicative of the data object type associated with data of the separate data system, a schema of the data object type using a schema record maintained by the relational database system, transmit, to the separate data system based at least in part on identifying the schema, a request for data associated with the query, receive, from the separate data system in response to the request, the requested data, and return, to the client, a query response that indicates the data retrieved from the separate data system.

Some examples of the method, apparatuses, and non-transitory computer-readable medium described herein may further include operations, features, means, or instructions for receiving, at the relational database system, a request to create the data object of the data object type, generating the schema of the data object type based at least in part on receiving the request, and transmitting, to the separate data system, an indication of the schema such that the separate data system may be configured to ingest data corresponding to the data object type.

In some examples of the method, apparatuses, and non-transitory computer-readable medium described herein, generating the schema may include operations, features, means, or instructions for receiving an indication of one or more columns to adjust for ingesting data corresponding to the data object type and generating a data stream process based at least in part on receiving the indication, wherein the data stream process may be configured to execute at the separate data system for ingesting data of the data object type.

In some examples of the method, apparatuses, and non-transitory computer-readable medium described herein, transmitting the request for the data may include operations, features, means, or instructions for transmitting, to the separate data system, an application programming interface request that may be generated based at least in part on an entity identifier included in the query.

Some examples of the method, apparatuses, and non-transitory computer-readable medium described herein may further include operations, features, means, or instructions for identifying, based at least in part on the query, a tenant of a plurality of tenants supported by the relational database system and identifying a token that may be associated with the identified tenant may be to be used for authenticating the request to the separate data system, wherein the token may be transmitted with the request such that the request may be authenticated.

Some examples of the method, apparatuses, and non-transitory computer-readable medium described herein may further include operations, features, means, or instructions for identifying, based at least in part on determining that the query may be indicative of the data object type associated with data stored in the separate data system, entity information associated with the data object and identifying the schema of the data object type based at least in part on the entity information.

In some examples of the method, apparatuses, and non-transitory computer-readable medium described herein, determining that the query may be indicative of the data object type may include operations, features, means, or instructions for identifying that the query includes an object suffix that indicates that the data object may be of the data object type that may be associated with the data stored in the separate data system.

In some examples of the method, apparatuses, and non-transitory computer-readable medium described herein, the separate data system may be a non-relational database system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, at a relational database system, a request to create a data object of a first type, wherein the request includes an entity name corresponding to the data object, the relational database system being configured to store data objects of a second type such that data objects of the second type are associated with a respective data table in the relational database system and a respective value of a key prefix of an object identifier field, the key prefix resulting in an upper limit of data objects supportable by the relational database system;
creating a data table corresponding to the data object at a separate data system, data objects of the first type associated with respective data tables in the separate data system and a same value of the key prefix such that the upper limit is exceeded, and wherein the data object is identifiable from the separate data system based at least in part on the entity name corresponding to the data object;
receiving, from a client at the relational database system, a query for the data object of the first type;
determining that the query is indicative of the data object of the first type
determining, based at least in part on determining that the query is indicative of the data object of the first type, that the data object is stored in a separate data system from the relational database system and associated with the same value of the key prefix;
transmitting, to the separate data system, a request associated with the data object, wherein the request is generated based at least in part on mapping information maintained in the relational database system and including information that is used to differentiate between data objects of the first type stored in the separate data system and sharing the same value of the key prefix;
identifying a result of the query based at least in part on transmitting the request; and
returning, to the client, a query response that indicates the result of the query.

2. The method of claim 1, wherein identifying the result of the query comprises:
transmitting, to the separate data system, an application programming interface request that is generated based at least in part on an entity identifier included in the query.

3. The method of claim 1, further comprising:
identifying, based at least in part on determining that the query is indicative of the data object of the first type, entity information corresponding to the data object, wherein the data objects of the first type are associated with the same value of the key prefix but respective entity information and wherein a second data object of the data objects of the second type is associated with a respective key prefix value that corresponds to respective entity information; and
identifying the result of the query based at least in part on the identified entity information for the data object.

4. The method of claim 1, wherein determining that the query is indicative of the data object of the first type comprises:
identifying that the query includes an object suffix that indicates that the data object is of the first type.

5. An apparatus for data processing, comprising:
a processor;
memory coupled with the processor; and
instructions stored in the memory and executable by the processor to cause the apparatus to:
receive, at a relational database system, a request to create a data object of a first type, wherein the request includes an entity name corresponding to the data object, the relational database system being configured to store data objects of a second type such that data objects of the second type are associated with a respective data table in the relational database system and a respective value of a key prefix of an object identifier field, the key prefix resulting in an upper limit of data objects supportable by the relational database system;
creating a data table corresponding to the data object at a separate data system, data objects of the first type associated with respective data tables in the separate data system and a same value of the key prefix such that the upper limit is exceeded, and wherein the data object is identifiable from the separate data system based at least in part on the entity name corresponding to the data object;
receive, from a client at the relational database system, a query for the data object of the first type;
determine that the query is indicative of the data object of the first type
determine, based at least in part on determining that the query is indicative of the data object of the first type, that the data object is stored in a separate data system from the relational database system and associated with the same value of the key prefix;
transmit, to the separate data system, a request associated with the data object, wherein the request is generated based at least in part on mapping information maintained in the relational database system and including information that is used to differentiate between data objects of the first type stored in the separate data system and sharing the same value of the key prefix;
identify a result of the query based at least in part on transmitting the request; and
return, to the client, a query response that indicates the result of the query.

6. The apparatus of claim 5, wherein the instructions to identify the result of the query are executable by the processor to cause the apparatus to:
transmit, to the separate data system, an application programming interface request that is generated based at least in part on an entity identifier included in the query.

7. The apparatus of claim 5, wherein the instructions are further executable by the processor to cause the apparatus to:

identify, based at least in part on determining that the query is indicative of the data object of the first type, entity information corresponding to the data object, wherein the data objects of the first type are associated with the same value of the key prefix but respective entity information and wherein a second data object of the data objects of the second type is associated with a respective key prefix value that corresponds to respective entity information; and identify the result of the query based at least in part on the identified entity information for the data object.

8. The apparatus of claim 5, wherein the instructions to determine that the query is indicative of the data object of the first type are executable by the processor to cause the apparatus to:

identify that the query includes an object suffix that indicates that the data object is of the first type.

9. A non-transitory computer-readable medium storing code for data processing, the code comprising instructions executable by a processor to:

receive, at a relational database system, a request to create a data object of a first type, wherein the request includes an entity name corresponding to the data object, the relational database system being configured to store data objects of a second type such that data objects of the second type are associated with a respective data table in the relational database system and a respective value of a key prefix of an object identifier field, the key prefix resulting in an upper limit of data objects supportable by the relational database system;

creating a data table corresponding to the data object at a separate data system, data objects of the first type associated with respective data tables in the separate data system and a same value of the key prefix such that the upper limit is exceeded, and wherein the data object is identifiable from the separate data system based at least in part on the entity name corresponding to the data object;

receive, from a client at the relational database system, a query for the data object of the first type;

determine that the query is indicative of the data object of the first type determine, based at least in part on determining that the query is indicative of the data object of the first type, that the data object is stored in a separate data system from the relational database system and associated with the same value of the key prefix;

transmit, to the separate data system, a request associated with the data object, wherein the request is generated based at least in part on mapping information maintained in the relational database system and including information that is used to differentiate between data objects of the first type stored in the separate data system and sharing the same value of the key prefix;

identify a result of the query based at least in part on transmitting the request; and return, to the client, a query response that indicates the result of the query.

10. The non-transitory computer-readable medium of claim 9, wherein the instructions to identify the result of the query are executable by the processor to:

transmit, to the separate data system, an application programming interface request that is generated based at least in part on an entity identifier included in the query.

11. The non-transitory computer-readable medium of claim 9, wherein the instructions are further executable by the processor to:

identify, based at least in part on determining that the query is indicative of the data object of the first type, entity information corresponding to the data object, wherein the data objects of the first type are associated with the same value of the key prefix but respective entity information and wherein a second data object of the data objects of the second type is associated with a respective key prefix value that corresponds to respective entity information; and identify the result of the query based at least in part on the identified entity information for the data object.

* * * * *